United States Patent
Otaki et al.

(10) Patent No.: US 9,864,373 B2
(45) Date of Patent: Jan. 9, 2018

(54) AUTONOMOUS DRIVING CONTROL SYSTEM FOR VEHICLE

(71) Applicant: TOYOTA JIDOSHA KABUSHIKI KAISHA, Toyota-shi, Aichi-ken (JP)

(72) Inventors: Sho Otaki, Susono (JP); Toshiki Kindo, Yokohama (JP); Yasuo Sakaguchi, Nagoya (JP); Ryuji Funayama, Yokohama (JP); Ayako Shimizu, Numazu (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/427,524

(22) Filed: Feb. 8, 2017

(65) Prior Publication Data
US 2017/0261982 A1  Sep. 14, 2017

(30) Foreign Application Priority Data

Mar. 11, 2016  (JP) .................................. 2016-048834

(51) Int. Cl.
*G05D 1/00* (2006.01)
*B60W 40/09* (2012.01)
(Continued)

(52) U.S. Cl.
CPC ........... *G05D 1/0061* (2013.01); *B60W 40/09* (2013.01); *B60W 50/08* (2013.01); *G05D 1/0088* (2013.01);
(Continued)

(58) Field of Classification Search
CPC ... G05D 1/0061; G05D 1/0088; B60W 40/09; B60W 50/08; B60W 2040/0827; B60W 2900/00; B60W 2540/26
See application file for complete search history.

(56) References Cited

U.S. PATENT DOCUMENTS 8,457,827 B1  6/2013 Ferguson et al.
2014/0156133 A1* 6/2014 Cullinane ............. B60W 30/00
701/23

(Continued)

FOREIGN PATENT DOCUMENTS

JP  6-171391 A  6/1994
JP  2000-29522 A  1/2000
(Continued)

*Primary Examiner* — Russell Frejd
(74) *Attorney, Agent, or Firm* — Sughrue Mion, PLLC

(57) ABSTRACT

An autonomous driving control system for a vehicle which is able to switch between manual driving and autonomous driving is provided with a driver condition sensor, acting part, and electronic control unit. The electronic control unit is provided with an autonomous driving control part, reliance calculating part for calculating an autonomous driving output reliance, vigilance calculating part for calculating a driver vigilance, and an action control part for controlling a strength of an action against a driver. In a region in which an operating point determined by the autonomous driving output reliance and driver vigilance can fall, a plurality of sub regions are defined by boundary lines extending so that the driver vigilance becomes higher as the autonomous driving output reliance becomes lower. The action control part controls the strength of the action against the driver to differ in accordance with the sub region in which the operating point falls.

9 Claims, 19 Drawing Sheets

(51) Int. Cl.
*B60W 50/08* (2012.01)
*B60W 40/08* (2012.01)
(52) U.S. Cl.
CPC . *B60W 2040/0827* (2013.01); *B60W 2540/26* (2013.01); *B60W 2900/00* (2013.01)

(56) References Cited

U.S. PATENT DOCUMENTS

| | | | |
|---|---|---|---|
| 2015/0283998 A1* | 10/2015 | Lind | B60W 30/00 |
| | | | 701/23 |
| 2015/0375757 A1 | 12/2015 | Schiek et al. | |
| 2016/0159251 A1 | 6/2016 | Ebina et al. | |
| 2016/0207538 A1* | 7/2016 | Urano | B60W 30/182 |
| 2016/0209841 A1* | 7/2016 | Yamaoka | G05D 1/0061 |
| 2016/0246298 A1* | 8/2016 | Sato | B60Q 9/00 |
| 2017/0021837 A1* | 1/2017 | Ebina | B60K 28/06 |
| 2017/0038774 A1* | 2/2017 | Ebina | B60W 50/14 |

FOREIGN PATENT DOCUMENTS

| | | |
|---|---|---|
| JP | 2000-82197 A | 3/2000 |
| JP | 2000182197 A | 6/2000 |
| JP | 2001-199295 A | 7/2001 |
| JP | 2015-63250 A | 4/2015 |
| JP | 2015-182624 A | 10/2015 |
| WO | 2015/011866 A1 | 1/2015 |
| WO | 2015/151243 A1 | 10/2015 |
| WO | 2015/162784 A1 | 10/2015 |
| WO | 2016/016037 A1 | 2/2016 |

\* cited by examiner

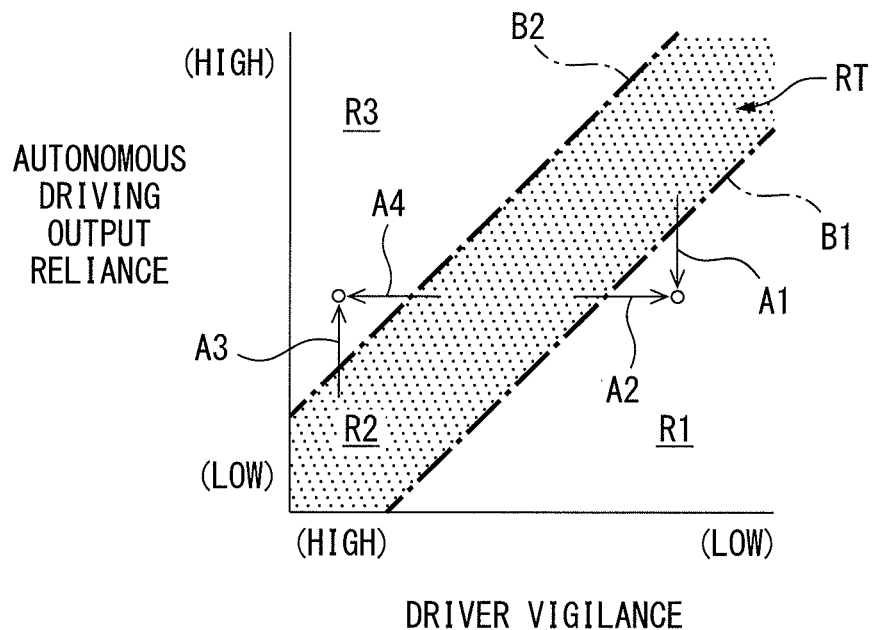

AUTONOMOUS DRIVING CONTROL SYSTEM FOR VEHICLE

BACKGROUND OF THE INVENTION

1. Field of the Invention

The present invention relates to an autonomous driving control system for a vehicle.

2. Related Art

It is known in the art an autonomous driving control system for a vehicle which is able to switch between manual driving and autonomous driving. The system is provided with an autonomous driving control part for controlling autonomous driving, a recognizing part for recognizing an awakeness of a driver, and an alarm part for prompting the driver to awake if the recognized awakeness is lower than a predetermined level (for example, see Japanese Patent Publication No. 6-171391A).

SUMMARY OF INVENTION

In this regard, while explained in detail later, to which extent the autonomous driving of the vehicle can be suitably performed, that is, to what extent an output of the autonomous driving control part can be relied on, is not necessary constant. Specifically, in a case where the autonomous driving control part for example uses signals from a GPS (Global Positioning System) to localize a host vehicle and performs autonomous driving based on the localization result, if the signals from the GPS can be received well, the autonomous driving control part can accurately localize the host vehicle and, therefore, can suitably perform autonomous driving. That is, at this time, a reliance of the output of the autonomous driving control part is high. As opposed to this, if it is difficult to receive the signals from the GPS well due to, for example, a terrain around the host vehicle, etc., the autonomous driving control part has difficulty in accurately localizing the host vehicle and therefore has difficulty in suitably performing autonomous driving. In other words, the reliance of the output of the autonomous driving control part at this time is low.

If the reliance of the output of the autonomous driving control part is low, the awakeness of the driver must be high in order to prepare for manual driving. Conversely, if the reliance of the output of the autonomous driving control part is high, the low awakeness of the driver is allowable.

However, Japanese Patent Publication No. 6-171391A mentioned above does not refer to the reliance of the output of the autonomous driving control part at all. For this reason, even if the reliance of the output of the autonomous driving control part is high, the awakeness of the driver is maintained higher than the predetermined level. As a result, the driver is liable to be maintained in an excessively tense state. On this point, if setting the above predetermined level low, the awakeness of the driver is maintained low and the problem of the driver being excessively tense may be able to be eliminated. However, in this case, if the reliance of the output of the autonomous driving control part falls for some sort of reason, the awakeness of the driver at this time is low. Thus, the driver may not be ready for manual driving sufficiently and therefore the driver is liable to be confused.

Therefore, if referring to a vigilance of the driver for autonomous driving as a driver vigilance, an object of the present invention is to provide an autonomous driving control system for a vehicle which is able to suitably maintain the driver vigilance, regardless of the autonomous driving output reliance.

According to one embodiment of the present invention, there is provided an autonomous driving control system for a vehicle which is able to switch between manual driving and autonomous driving, the system comprising: a driver condition sensor for detecting a condition of a driver; an acting part able to take an action against the driver; and an electronic control unit comprising: an autonomous driving control part configured to control the autonomous driving; a reliance calculating part configured to calculate an autonomous driving output reliance expressing a reliance of an output of the autonomous driving control part; a vigilance calculating part configured to calculate a driver vigilance expressing a vigilance of the driver for the autonomous driving based on the condition of the driver detected by the driver condition sensor; and an action control part configured to control the acting part to control a strength of an action against the driver, wherein, in a region in which an operating point determined by the autonomous driving output reliance and the driver vigilance can fall, a plurality of sub regions are defined by at least one boundary line extending so that the driver vigilance becomes higher as the autonomous driving output reliance becomes lower, and wherein the action control part is configured to control the strength of the action against the driver to differ in accordance with the sub region in which the operating point falls.

According to another embodiment of the present invention, there is provided an autonomous driving control system for a vehicle which is able to switch between manual driving and autonomous driving, the system comprising: a driver condition sensor for detecting a condition of a driver; an acting part able to take an action against the driver; and an electronic control unit comprising: an autonomous driving control part configured to control the autonomous driving; a reliance calculating part configured to calculate an autonomous driving output reliance expressing a reliance of an output of the autonomous driving control part; a vigilance calculating part configured to calculate a driver vigilance expressing a vigilance of the driver for the autonomous driving based on the condition of the driver detected by the driver condition sensor; a target vigilance calculating part configured to calculate a lower limit target vigilance, which is a lower limit target of the driver vigilance, based on the autonomous driving output reliance, the lower limit target vigilance becoming higher as the autonomous driving output reliance becomes lower; an vigilance deviation calculating part configured to calculate a vigilance deviation which is a deviation of the driver vigilance with respect to the lower limit target vigilance; and an action control part configured to control the acting part to control a strength of an action against the driver, wherein the action control part is configured to control the strength of the action against the driver so as to: maintain the driver vigilance equal to or higher than the lower limit target vigilance; and differ in accordance with the vigilance deviation.

According to still another embodiment of the present invention, there is provided an autonomous driving control system for a vehicle which is able to switch between manual driving and autonomous driving, the system comprising: a driver condition sensor for detecting a condition of a driver; a display part which the driver can view; and an electronic control unit comprising: an autonomous driving control part configured to control the autonomous driving; a reliance calculating part configured to calculate an autonomous driving output reliance expressing a reliance of an output of the autonomous driving control part; a vigilance calculating part configured to calculate a driver vigilance expressing a vigilance of the driver for the autonomous driving based on the condition of the driver detected by the driver condition sensor; and a display control part configured to control the display part to display the autonomous driving output reliance and the driver vigilance simultaneously on the display part.

The present invention may be more fully understood from the description of the preferred embodiments according to the invention as set forth below, together with the accompanying drawings.

BRIEF DESCRIPTION OF THE DRAWINGS

In the drawings:

FIG. 8 is a view for explaining action control of the first embodiment according to the present invention.

FIG. 9 is a view showing a map of a strength of an action against a driver.

DESCRIPTION OF THE PREFERRED EMBODIMENTS

Figure 1:
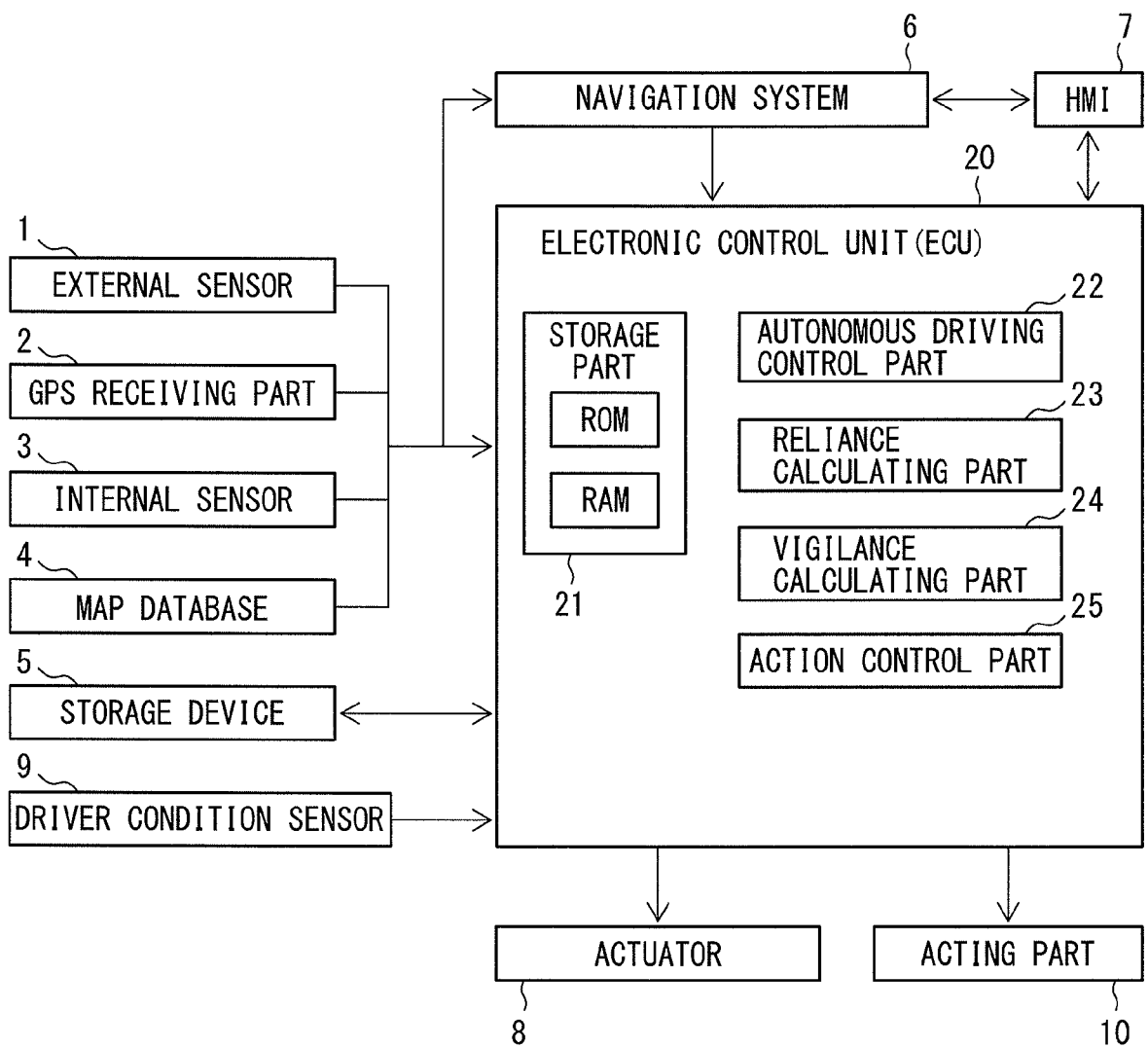
FIG. 1 is a view showing a block diagram of an autonomous driving control system for a vehicle of a first embodiment according to the present invention.

FIG. 1 shows a block diagram of an autonomous driving control system for a vehicle of a first embodiment according to the present invention. Referring to FIG. 1, the autonomous driving control system for a vehicle is provided with an external sensor 1, GPS receiving part 2, internal sensor 3, map database 4, storage device 5, navigation system 6, HMI (human machine interface) 7, actuator 8, driver condition sensor 9, acting part 10, and electronic control unit (ECU) 20.

Figure 2:
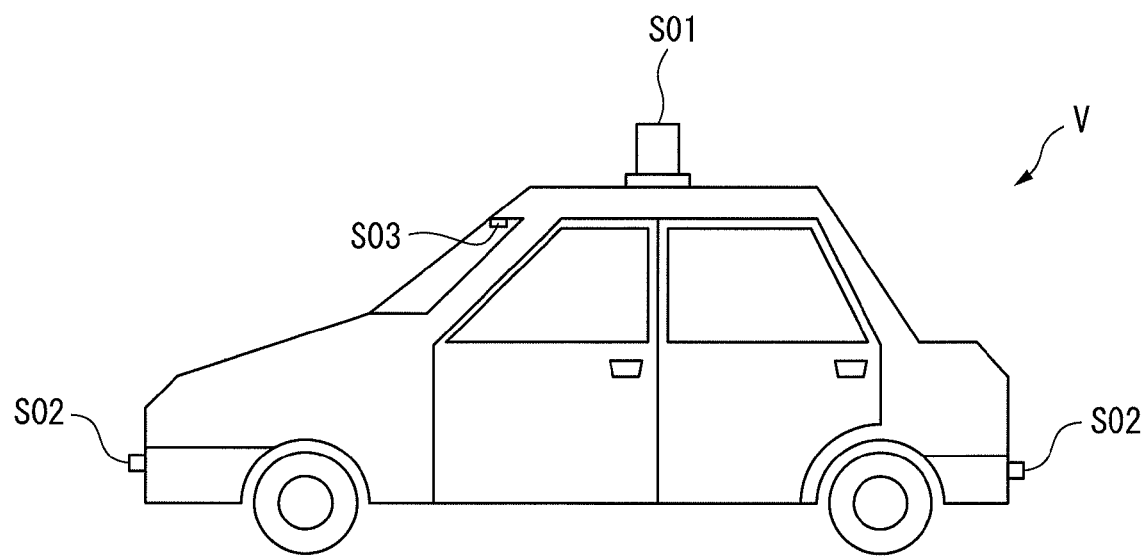
FIG. 2 is a schematic view for explaining an external sensor of the first embodiment according to the present invention.

The external sensor 1 is a detection device for detecting information on an outside or surroundings of a host vehicle. The external sensor 1 is provided with at least one of a LIDAR (laser imaging detection and ranging), radar, and camera. In the first embodiment according to the present invention, as shown in FIG. 2, the external sensor 1 is provided with a LIDAR SO1, radar SO2, and camera SO3.

The LIDAR SO1 is a device for detecting a road over which the host vehicle is running or at least one outside object using laser beams. In the example shown in FIG. 2, the LIDAR SO1 is installed on a roof of a vehicle V. The LIDAR SO1 successively fires laser beams toward the entire surroundings of the host vehicle V and measures distances to the road and object(s) from reflected lights to detect the road and object(s) around the host vehicle V in the form of a 3D image. The 3D image of the road and object(s) detected by the LIDAR SO1 is transmitted to the electronic control unit 20. On the other hand, a radar SO2 is a device for detecting at least one object outside the host vehicle V using electromagnetic waves. In the example shown in FIG. 2, the radars SO2 are attached to bumpers at the front and rear of the vehicle V. The radars SO2 emit electromagnetic waves from the radars SO2 to the surroundings of the host vehicle V and measure a distance to the object(s) in the surroundings of the host vehicle V from the reflected waves. The object information detected by the radars SO2 is sent to the electronic control unit 20. The camera SO3, in the example shown in FIG. 2, is provided with a front camera provided at an inside of a front glass of the vehicle V. The front camera SO3 captures a color image of an area in front of the host vehicle V. The color image information obtained by the front camera SO3 is transmitted to the electronic control unit 20. Note that, as explained above, the LIDAR SO1 and radars SO2 measure the distances to the object(s) around the host vehicle V. Therefore, one or both of these may also be referred to as a distance measurement sensor.

Referring again to FIG. 1, the GPS receiving part 2 receives signals from three or more GPS satellites to thereby detect the absolute location of the host vehicle V (for example, the latitude and longitude of the host vehicle V). The absolute location information of the host vehicle V detected by the GPS receiving part 2 is transmitted to the electronic control unit 20.

The internal sensor 3 is a detection device for detecting a running state of the host vehicle V. The running state of the host vehicle V is expressed by at least one of a speed, acceleration, and attitude of the host vehicle. The internal sensor 3 is provided with one or both of a vehicle speed sensor and IMU (inertial measurement unit). In the first embodiment according to the present invention, the internal sensor 3 is provided with the vehicle speed sensor and IMU. The vehicle speed sensor detects a speed of the host vehicle V. The IMU is provided for example with a three-axis gyro and a 3-direction acceleration sensor, and detects a 3D angular speed and acceleration of the host vehicle V to detect the acceleration and attitude of the host vehicle V based on these. The running state information of the host vehicle V detected by the internal sensor 3 is transmitted to the electronic control unit 20.

The map database 4 is a database relating to map information. This map database 4 is stored for example in an HDD (hard disk drive) mounted in the vehicle. The map information includes, for example, location information on roads and information on road shapes (for example, curved or straight, curvature of curves, locations of intersections, merging points, and branching points, etc.).

The storage device 5 stores a 3D image(s) of the object(s) detected by the LIDAR SO1, and a road map dedicated for autonomous driving which is produced based on a result of detection by the LIDAR SO1. The 3D image(s) of the object(s) and road map are constantly or periodically updated.

The navigation system 6 is a device for guiding the host vehicle V to a destination set by the driver of the host vehicle V through the HMI 7. This navigation system 6 calculates a target route up to the destination based on the current location information of the host vehicle V detected by the GPS receiving part 2 and the map information of the map database 4. The information on the target route of the host vehicle V is transmitted to the electronic control unit 20.

The HMI 7 is an interface for outputting and inputting information between a passenger of the host vehicle V and the autonomous driving control system for the vehicle. In the first embodiment according to the present invention, the HMI 7 is provided with a display for displaying text or image information, a speaker for emitting sound, and operating buttons or a touch panel for an input operation by the passenger.

The actuator 8 is a device for controlling driving operations of the host vehicle V in accordance with control signals from the electronic control unit 20. The driving operations of the vehicle V include powering, braking, and steering of the vehicle V. The actuator 8 is provided with at least one of a powering actuator, braking actuator, and steering actuator. The powering actuator controls an output of an engine or electric motor providing a drive power of the vehicle V and thereby controls the powering operation of the vehicle V. The braking actuator operates the braking system of the vehicle V and thereby controls the braking operation of the vehicle V. The steering actuator operates a steering system of the vehicle V and thereby controls the steering operation of the vehicle V.

If the passenger operates the HMI 7 to start autonomous driving, a signal is sent to the electronic control unit 20 and autonomous driving is started. That is, the driving operations of the vehicle V including powering, braking, and steering are controlled by the actuator 8. On the other hand, if the passenger operates the HMI 7 to stop autonomous driving, a signal is sent to the electronic control unit 20, the autonomous driving is stopped, and manual driving, in which at least one of the driving operations of the vehicle V is performed by the driver, is started. In other words, autonomous driving is switched to manual driving. Note that, during autonomous driving, if the driver operates the vehicle V, that is, if the driver steers the vehicle, or if the driver steps on the accelerator pedal, or if the driver steps on the brake pedal, autonomous driving is switched to manual driving. Furthermore, if it is judged during autonomous driving that autonomous driving would be difficult, manual driving is requested to the driver through the HMI 7.

The driver condition sensor 9 is a detection device for detecting a condition of the driver. The condition of the driver is expressed by, for example, one or both of an appearance and internal condition of the driver. The appearance of the driver is expressed by, for example, at least one of a line of vision of the driver, a state of eyelids of the driver, a direction of a face of the driver, a posture of the driver, whether the driver is engaged in a second task, whether the driver is gripping the steering wheel, a distribution of pressure which the driver applies to a seat of the vehicle V (a sitting pressure), and an amount of adjustment of the driver's seat. The posture of the driver is expressed by whether arms of the driver are crossed or not, where hands of the driver are located, etc. The second task includes behaviors other than operations to drive the vehicle V, such as an operation of a mobile phone. The amount of adjustment of the driver's seat is expressed by a position of the driver's seat, an angle of a back part of the seat, and other parameters able to be adjusted by the driver. On the other hand, the internal condition of the driver is expressed by, for example, a physiological indicator such as heart rate, blood pressure, or skin potential of the driver.

Figure 3:
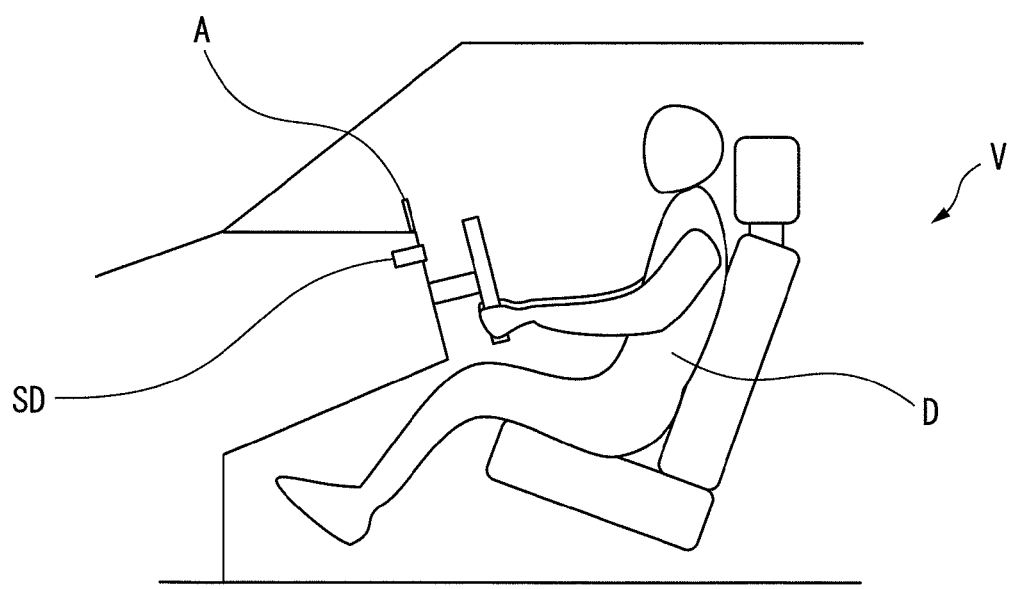
FIG. 3 is a schematic view for explaining an internal sensor of the first embodiment according to the present invention.

In a case where the condition of the driver is expressed by the line of vision of the driver, the state of the eyelids of the driver, the direction of the face of the driver, the posture of the driver, whether the driver is engaged in a second task, etc., the driver condition sensor is provided with, for example, a driver camera attached to the inside of the vehicle V. This driver camera captures an image of the driver. In the example shown in FIG. 3, the driver condition sensor 9 is provided with a driver camera SD attached to an instrument panel of the vehicle V so as to face the driver D. In a case where the condition of the driver is expressed by whether the driver is gripping the steering wheel, the driver condition sensor 9 is provided with, for example, a contact sensor attached to the steering wheel. This contact sensor detects, for example, whether the driver is gripping the steering wheel with a gripping force higher than a predetermined set gripping force. In a case where the condition of the driver is expressed by the distribution of the sitting pressure, the driver condition sensor 9 is provided with a sitting pressure sensor attached to the seat. This sitting pressure sensor detects the distribution of the sitting pressure. In a case where the condition of the driver is expressed by the state of the driver's seat, the driver condition sensor 9 is provided with a seat status sensor attached to the seat.

This seat status sensor detects the state of the driver's seat. In a case where the condition of the driver is expressed by the internal condition of the driver, the driver condition sensor 9 is provided with, for example, an internal condition sensor attached to the steering wheel. This internal condition sensor detects, for example, the physiological indicator of the driver. The information on the condition of the driver detected by the driver condition sensor 9 is transmitted to the electronic control unit 20.

The acting part 10 is a device able to take an action against the driver. The action against the driver includes, for example, at least one of a visual action, audio action, and body sensory action. In a case where the action against the driver includes the visual action, the acting part 10 is provided with a display part able to be viewed by the driver. The display part is provided with, for example, at least one of a display for displaying text information or image information, lights, etc. In the example shown in FIG. 3, the acting part 10 is provided with a display A attached to the instrument panel of the vehicle V. Note that, in the first embodiment according to the present invention, the acting part 10 and the HMI 7 are provided with a common display. In another embodiment according to the present invention (not shown), the acting part 10 and the HMI 7 are provided with respectively separate displays. On the other hand, in a case where the action against the driver includes the audio action, the acting part 10 is provided with, for example, a speaker for emitting a sound or voice. In a case where the action against the driver includes the body sensory action, the acting part 10 is provided with, for example, at least one of a vibrator for conveying vibration to the driver, a driver seat adjuster for changing an angle or position of the seat of the driver, etc.

The acting part 10 can change a strength of the action against the driver. That is, in a case where the acting part 10 is provided with a display, the action against the driver is strengthened by, for example, making a frequency of change of the image etc. displayed on the display higher, while the action is weakened by making this frequency lower. Alternatively, the action against the driver is strengthened by making an interval of change of the image etc. shorter, while the action is weakened by making this interval longer. In a case where the acting part 10 is provided with a speaker, the action against the driver is strengthened by, for example, making the volume of the sound emitted from the speaker larger, while the action is weakened by making the volume smaller. Alternatively, the action against the driver is strengthened by making a frequency of the sound emitted from the speaker higher while the action is weakened by making the frequency of this sound lower. In a case where the acting part 10 is provided with a driver seat adjuster, the action against the driver is strengthened by, for example, making the back part of the seat closer to a vertical orientation, while the action is weakened by making the back part closer to a horizontal orientation.

The electronic control unit 20 is a computer provided with components connected with each other by a bidirectional bus such as a CPU (central processing unit), ROM (read only memory), and RAM (random access memory). As shown in FIG. 1, the electronic control unit 20 of the first embodiment according to the present invention is provided with a storage part 21 having a ROM and RAM, autonomous driving control part 22, reliance calculating part 23, vigilance calculating part 24, and action control part 25.

Figure 4:
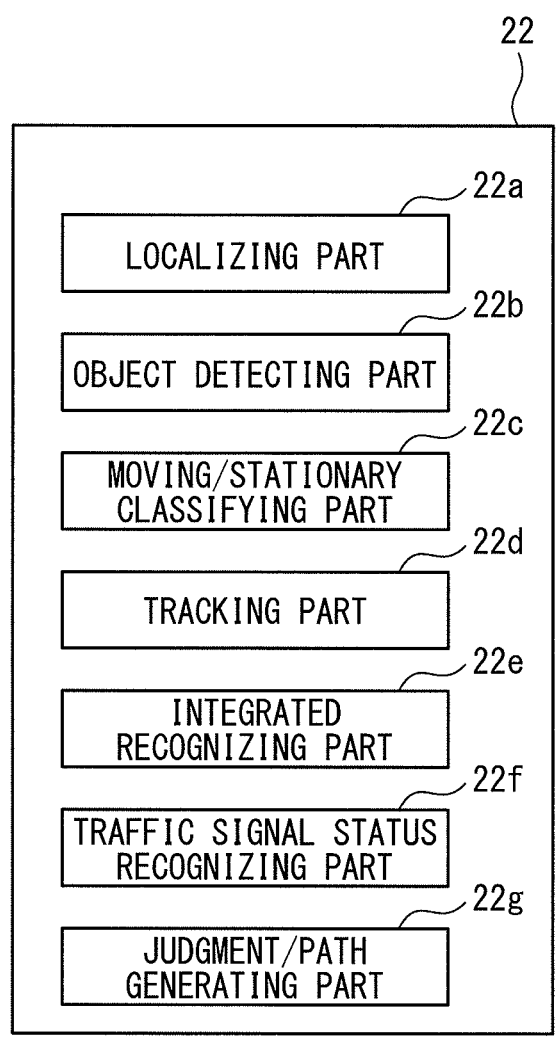
FIG. 4 is a view showing a block diagram of an autonomous driving control part of the first embodiment according to the present invention.

The autonomous driving control part 22 is configured to control autonomous driving of the vehicle. FIG. 4 shows a block diagram of the autonomous driving control part 22 of the first embodiment according to the present invention. Referring to FIG. 4, the autonomous driving control part 22 of the first embodiment according to the present invention is provided with a plurality of control parts, that is, a localizing part 22a, object detecting part 22b, moving/stationary classifying part 22c, tracking part 22d, integrated recognizing part 22e, traffic signal status recognizing part 22f, and judgment/path generating part 22g. Next, referring to FIG. 5, functions of the autonomous driving control part 22 will be explained.

Figure 5:
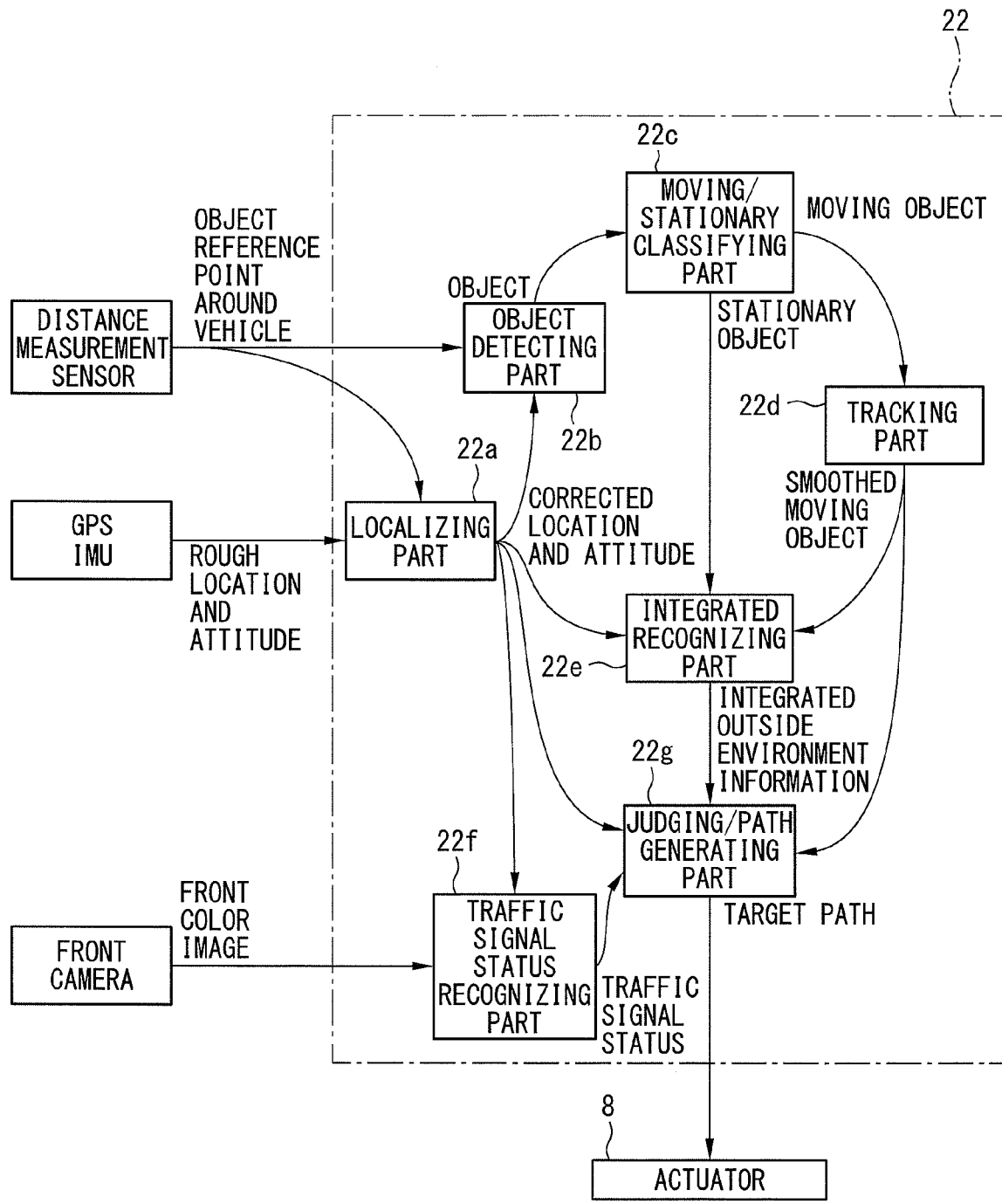
FIG. 5 is a schematic view for explaining a function of an autonomous driving control part.

Referring to FIG. 5, to the localizing part 22a, the information on a rough location and attitude of the host vehicle V is input from the GPS receiving part and IMU, and the information on an object reference point(s) around the host vehicle V is input from the distance measurement sensor. At the localizing part 22a, the location and attitude of the host vehicle V are corrected based on these inputs and road map dedicated for autonomous driving stored in the storage device 5. In one example, the location and attitude of the host vehicle V are corrected so that the location(s) of the object reference point(s) input from the distance measurement sensor matches the location(s) of the object reference point(s) in the road map. That is, the information on the corrected location and attitude of the host vehicle V is output from the localizing part 22a.

On the other hand, to the object detecting part 22b, the information on the object reference point(s) around the host vehicle V is input from the distance measurement sensor, and the corrected location and attitude of the host vehicle V is input from the localizing part 22a. At the object detecting part 22b, the object(s) around the host vehicle V is detected based on these inputs and the road map in the storage device 5. In one example, the object(s) is detected based on differences between the object reference point(s) detected by the distance measurement sensor and the object reference point(s) in the road map. In another embodiment (not shown), the object(s) is detected based on whether a shape(s) of the object reference point(s) detected by the distance measurement sensor matches a shape(s) of a template(s) stored in advance. That is, the information on the object(s) around the host vehicle V is output from the object detecting part 22b.

To the moving/stationary classifying part 22c, the information on the object(s) around the host vehicle V is input from the object detecting part 22b. At the moving/stationary classifying part 22c, it is classified if the object(s) is a moving object(s) or stationary object(s) based on this input and the road map in the storage device 5. The moving object(s) is an object(s) which can move, such as other vehicles, pedestrians, while the stationary object(s) is an object(s) which cannot move, such as buildings. That is, information on moving object(s) and information on stationary object(s) are output from the moving/stationary classifying part 22c.

To the tracking part 22d, the information on the moving object(s) is input from the moving/stationary classifying part 22c. At the tracking part 22d, a movement(s) of the moving object(s) is tracked and smoothened based on this input. That is, the information on the smoothened movement(s) of moving object(s) is output from the tracking part 22d.

To the integrated recognizing part 22e, the information on the corrected location and attitude of the host vehicle V is input from the localizing part 22a, the information on the stationary object(s) is input from the moving/stationary classifying part 22c, and the information on the smoothened movement(s) of the moving object(s) is input from the tracking part 22d. At the integrated recognizing part 22e, integrated outside environment information in which various information on the outside environment of the host vehicle V integrated together is formed based on these inputs. The integrated outside environment information includes, for example, information identifying the moving object(s) (for example, whether the moving object(s) is a vehicle(s) or pedestrian(s)), information identifying the stationary object(s) (for example, whether the stationary object(s) is a stationary vehicle(s) or building(s)) etc. That is, the integrated outside environment information is output from the integrated recognizing part 22e.

To the traffic signal status recognizing part 22f, the front color image is input from the front camera. At the traffic signal status recognizing part 22f, information on a traffic signal in front of the host vehicle V is identified. The information on the traffic signal includes whether there is a traffic signal in front of the host vehicle V, whether the traffic signal is green, and other information. That is, the information on the state of the traffic signal is output from the traffic signal status recognizing part 22f.

To the judgment/path generating part 22g, the information on the corrected location and attitude of the host vehicle V is input from the localizing part 22a, the integrated outside environment information is input from the integrated recognizing part 22e, the information on the smoothened movement(s) of the moving object(s) is input from the tracking part 22d, and the information on the state of the traffic signal is input from the traffic signal status recognizing part 22f. At the judgment/path generating part 22g, various judgments are made based on these inputs, the road map in the storage device 5, and the target route calculated by the navigation system 6, and information on the target path of the host vehicle V is generated. That is, the information on the target path of the host vehicle V is output from the judgment/path generating part 22g.

The information on the target path output from the judgment/path generating part 22g, that is, the output of the autonomous driving control part 22, is input to the actuator 8. At the actuator 8, the driving operations of the host vehicle V are controlled so that the host vehicle V is driven in accordance with the target path.

Referring again to FIG. 1, the reliance calculating part 23 is configured to calculate an autonomous driving output reliance expressing a reliance of the output of the autonomous driving control part 22. Note that, the autonomous driving output reliance is calculated in the form of a numerical value which changes continuously or in steps.

The vigilance calculating part 24 is configured to calculate a driver vigilance expressing a vigilance of the driver for the autonomous driving based on the condition of the driver detected by the driver condition sensor 9. Note that the driver vigilance is calculated in the form of a numerical value which changes continuously or in steps.

The action control part 25 is configured to control the acting part 10 to control the strength of the action against the driver.

Now then, as explained above, the autonomous driving output reliance expresses a reliance of the output of the autonomous driving control part 22. In the first embodiment according to the present invention, the output of the autonomous driving control part 22 is the output of the judgment/path generating part 22g, that is, the information on the target path, and thus the autonomous driving output reliance expresses a reliance of the information on the target path. That is, for example, if the information on the target path is accurate, the autonomous driving output reliance is higher, compared with if the information on the target path is inaccurate.

As explained while referring to FIG. 5, the output of the autonomous driving control part 22, that is, the output of the judgment/path generating part 22g, is found based on the outputs of the above-mentioned plurality of control parts 22a, 22b, 22c, 22d, 22e, and 22f. Therefore, the reliance of the output of the autonomous driving control part 22, that is, the autonomous driving output reliance, depends on the reliance of the outputs of the control parts 22a, 22b, 22c, 22d, 22e, and 22f. Therefore, in the first embodiment according to the present invention, the autonomous driving output reliance is calculated based on the reliance of at least one output of the plurality of control parts 22a, 22b, 22c, 22d, 22e, 22f, and 22g.

Specifically, for example, if the output of the localizing part 22a, that is, the information on the location and attitude of the host vehicle V, is accurate, the reliance of the output of the localizing part 22a is higher and therefore the autonomous driving output reliance is higher, compared with if this information is inaccurate. In this case, for example, if the number of GPS satellites from which signals are received is large, the output of the localizing part 22a is more accurate compared with if the number of GPS satellites from which signals are received is small. Alternatively, if the GPS satellites from which signals are received are positioned dispersed apart, the output of the localizing part 22a is more accurate compared with if the GPS satellites from which signals are received are positioned grouped together. Alternatively, if the number of information on the object reference point(s) input from the distance measurement sensor is large, the output of the localizing part 22a is more accurate compared with if the number of information on the object reference point(s) is small. Alternatively, if a difference(s) between the location(s) of the object reference point(s) detected by the distance measurement sensor and the location(s) of the object reference point(s) in the road map is small, the output of the localizing part 22a is more accurate compared with if the difference(s) is large.

Alternatively, if the output of the object detecting part 22b, that is, the information on an object(s), is accurate, the autonomous driving output reliance is higher compared with if the information is inaccurate. In this case, for example, if the number of location(s) of the object reference point(s) detected by the distance measurement sensor is large, the output of the object detecting part 22b is more accurate compared with if the number of location(s) is small. Alternatively, if a sum of squares of difference(s) between the location(s) of object reference point(s) detected by the distance measurement sensor and the location(s) of the object reference point(s) in the road map is small, the output of the object detecting part 22b is more accurate compared with if the sum is large. Alternatively, if the number of matching point(s) between a shape(s) of an object reference point(s) detected by a distance measurement sensor and a shape(s) of a template is large, the output of the object detecting part 22b is more accurate compared with if the number of matching point(s) is small.

If the output of the moving/stationary classifying part 22c, that is, the information on moving object(s) or the information on stationary object(s), is accurate, the autonomous driving output reliance is higher compared with if the information is inaccurate. In this case, for example, if a ratio of the number of actually detected stationary object(s) with respect to the number of stationary object(s) stored in the road map and able to be detected from the location of the host vehicle V is high, the output of the moving/stationary classifying part 22c is more accurate compared with if the ratio is low. Alternatively, if a degree of match of a shape(s), volume(s), etc. of the moving object(s) detected before a predetermined time and the shape(s), volume(s), etc. of the moving object(s) detected at the present time is high, the output of the moving/stationary classifying part 22c is more accurate compared with if the extent of match is low.

If the output of the tracking part 22d, that is, the information on smoothened movement(s) of the moving object(s), is accurate, the autonomous driving output reliance is higher compared with if the information is inaccurate. In this case, for example, if the location(s) of the moving object(s) is estimated based on the information on the moving object(s) detected and a deviation of the estimated location from an actual location(s) of the moving object(s) is small, the output of the tracking part 22d is more accurate compared with if the deviation is large.

If the output of the integrated recognizing part 22e, that is, the integrated outside environment information, is accurate, the autonomous driving output reliance is higher compared with if this information is inaccurate. In this case, for example, if a consistency of the output of the localizing part 22a, the output of the object detecting part 22b, the output of the moving/stationary classifying part 22c, and the output of the tracking part 22d is high, the output of the integrated recognizing part 22e is more accurate compared with if the consistency is low. For example, there may be a case where the object detecting part 22b detects a certain object as a pedestrian while the moving/stationary classifying part 22c detects the object in question as a stationary object. In such a case, it is judged that the consistency of the output of the object detecting part 22b and the output of the moving/stationary classifying part 22c is low. Note that, such inconsistency is liable to occur if the object in question is a poster including a photo of a person.

If the output of the traffic signal status recognizing part 22f, that is, the information on the state of the traffic signal, is accurate, the autonomous driving output reliance is higher compared with if this information is inaccurate. In this case, for example, a dimension of the traffic signal which is predicted to be detected from the current location of the host vehicle is calculated based on the current location of the host vehicle and road map, and if a deviation between the calculated dimension and a dimension of the traffic signal actually detected by the front camera is small, the output of the traffic signal status recognizing part 22f is more accurate compared with if the deviation is large.

In another embodiment (not shown), for example, a dangerousness of the vehicle when assuming the vehicle cannot run in accordance with the target path is calculated. If this dangerousness falls or is maintained, the reliance of the target path, that is, the reliance of the output of the judgment/path generating part 22g, is higher compared with if the dangerousness increases.

Furthermore, as shown in FIG. 5, the output of the autonomous driving control part 22 is found based on the outputs of the distance measurement sensor, GPS receiving part, IMU, and front camera. Therefore, the reliance of the output of the autonomous driving control part 22 also depends on reliance of the outputs of the distance measurement sensor, GPS receiving part, IMU, and front camera. Therefore, in the first embodiment according to the present invention, the autonomous driving output reliance is calculated based on the reliance of the output of at least one of the distance measurement sensor, GPS receiving part, IMU, and front camera.

Furthermore, the autonomous driving output reliance also depends on the shape of the road over which the vehicle is running (for example, curved or straight, curvature of curves, locations of intersections, merging points, and branching points etc.) and the situation around the vehicle (for example, whether the vehicle is at an intersection, whether the vehicle is located around a train station, etc.). That is, for example, if a vehicle is running over a curve, there is a higher possibility that the output of the localizing part 22a is inaccurate compared to if the vehicle is running over a straight portion. Therefore, it is estimated that the autonomous driving output reliance is low. Alternatively, a large number of pedestrians and vehicles are likely present around a train station and thus, if a vehicle is located around the train station, there is a higher possibility that the output of the object detecting part 22b is inaccurate compared with if the vehicle is not located there and therefore it is predicted that the autonomous driving output reliance is low. Therefore, in the first embodiment according to the present invention, for example, the autonomous driving output reliance is stored linked with map information in the map database 4 or the road map in the storage device 5. The autonomous driving output reliance is calculated based on the running location of the host vehicle on the map.

In addition, in the first embodiment according to the present invention, when the vehicle is actually running, the autonomous driving output reliance calculated at this time is stored linked with the running location of the host vehicle on the map. When the vehicle is next running at that location, the autonomous driving output reliance linked with this location is calculated as the autonomous driving output reliance at this time.

Note that, as explained above, if it is judged that autonomous driving is difficult, the driver is requested to perform manual driving. In the first embodiment according to the present invention, if the autonomous driving output reliance is lower than a predetermined constant lower limit value, it is judged that autonomous driving is difficult and the driver is requested to perform manual driving.

On the other hand, the driver vigilance, as explained above, shows a vigilance of the driver for the autonomous driving. That is, the driver vigilance shows to what extent the driver has prepared for manual driving at the time of autonomous driving. Specifically, if the driver has sufficiently prepared for manual driving, the driver vigilance is higher compared with if the preparation is insufficient.

This driver vigilance is calculated based on the above-mentioned condition of the driver. Specifically, for example, if a line of vision of the driver is directed to the front of the vehicle V, the driver vigilance is higher compared with if the line of vision of the driver is directed to the sides. Alternatively, if a time during which the line of vision of the driver is directed to the front of the vehicle V is long and a frequency by which the driver checks the side mirrors or back mirror is high, the driver vigilance is higher compared with if the time during which the line of vision of the driver is directed to the front of the vehicle V is short or if the frequency by which the driver checks the side mirrors or back mirror is low. If a time during which the line of vision of the driver is directed to an object(s), in particular a moving object(s), is long, the driver vigilance is higher compared with if this time is short. If a frequency of blinking of the driver is high, the driver vigilance is higher compared with if the frequency of blinking of the driver is low. If the driver is not crossing the driver's arms, the driver vigilance is higher compared with if the driver is crossing the driver's arms. If the driver is not engaged in a second task, the driver vigilance is higher compared with if driver is engaged in the second task. Note that the driver vigilance also depends on a type and time of the second task performed by the driver. If the driver is gripping the steering wheel, the driver vigilance is higher compared with if the driver is not gripping the steering wheel. If an offset of the distribution of the sitting pressure of the driver is small, the driver vigilance is higher compared with if the offset of the distribution is large. Alternatively, if a deviation of the distribution of sitting pressure of the driver from a predetermined reference distribution is small, the driver vigilance is higher compared with if the deviation is large. In one example, the reference distribution is constant. In another example, the reference distribution is set in accordance with the individual driver. If the back part of the driver's seat is set closer to the vertical orientation, the driver vigilance is higher compared with if the back part is tilted closer to the horizontal orientation. If a heart rate of the driver is high, the driver vigilance is higher compared with if the heart rate of the driver is low.

If the action against the driver mentioned above is taken, the driver vigilance increases. In this case, an extent of increase of driver vigilance depends on a strength of the action against the driver. That is, if the action against the driver is strong, the driver vigilance greatly increases. If the action against the driver is weak, the driver vigilance increases just slightly or does not change much at all. On the other hand, if no action against the driver is taken, the driver vigilance falls along with time, unless the driver takes an action which increases the driver vigilance spontaneously. Therefore, the driver vigilance can be controlled by controlling the action against the driver.

Now then, in the first embodiment according to the present invention, in a region in which an operating point determined by the autonomous driving output reliance and driver vigilance can fall, a plurality of sub regions are defined by at least one boundary line extending so that the driver vigilance becomes higher as the autonomous driving output reliance becomes lower. Further, part of the plurality of sub regions is set as a target sub region.

Figure 6:
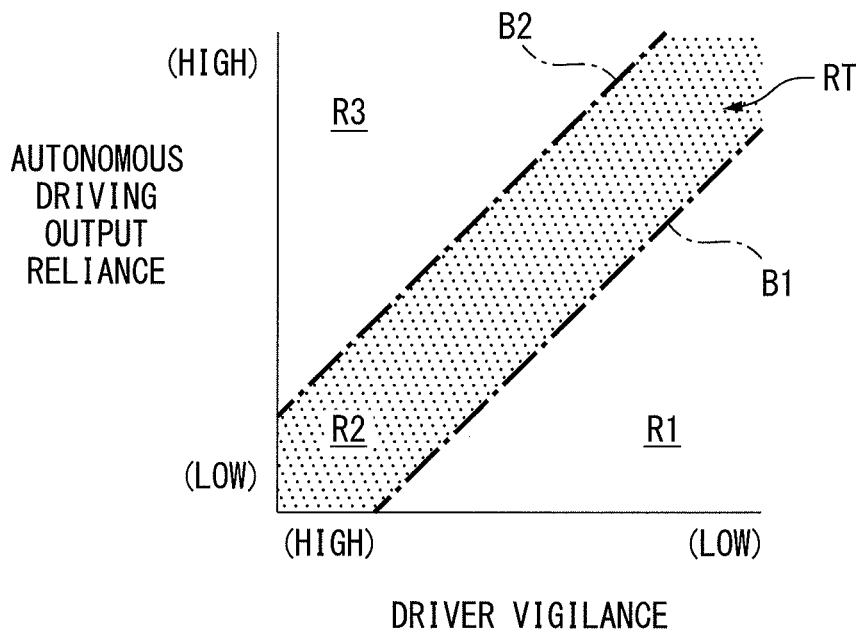
FIG. 6 is a view showing a map of sub regions.

In the example shown in FIG. 6, in the region in which the operating point can fall, three sub regions R1, R2, and R3 are defined by two boundary lines B1 and B2 extending so that the driver vigilance becomes higher as the autonomous driving output reliance becomes lower. Note that, in FIG. 6, the autonomous driving output reliance of the ordinate becomes higher as it goes upward, while the driver vigilance of the abscissa becomes higher as it goes left. The first boundary line B1 is extending at the side of the lower autonomous driving output reliance and lower driver vigilance, while the second boundary line B2 is extending at the side of the higher autonomous driving output reliance and higher driver vigilance. The first sub region R1 is located at the side of the lower autonomous driving output reliance and lower driver vigilance with respect to the first boundary line B1. The second sub region R2 is located between the first boundary line B1 and the second boundary line B2. The third sub region R3 is located at the side of higher autonomous driving output reliance and higher driver vigilance with respect to the second boundary line B2.

Further, one among the three sub regions R1, R2, and R3, specifically the second sub region R2, is set as the target sub region RT. In FIG. 6, the target sub region RT is shown with dots. The sub regions R1, R2, and R3 and the target sub region RT are stored in advance in the form of a map shown in FIG. 6 in the ROM of the storage part 21. Note that, in the example shown in FIG. 6, the boundary lines B1 and B2 are also included in the target sub region RT.

Based on the above, in the first embodiment according to the present invention, the action control part 25 is configured to control a strength of the action against the driver so that the operating point is maintained in the target sub region RT.

Figure 7:
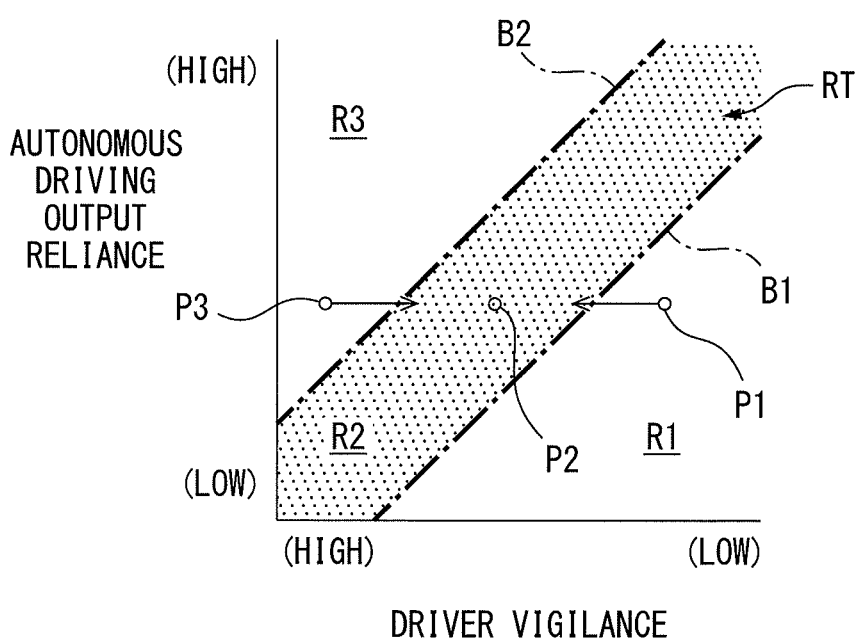
FIG. 7 is a view for explaining action control of the first embodiment according to the present invention.

That is, if the operating point falls in the first sub region R1 as shown in FIG. 7 by P1, the strength of the action against the driver is controlled so that the operating point moves to the target sub region RT. Specifically, the relatively strong action against the driver is taken to thereby increase the driver vigilance relatively larger, and therefore the operating point is moved to the target sub region RT. In this case, if the action against the driver is excessively strong, the operating point is moved to the third sub region R3, while if the action against the driver is excessively weak, the operating point is maintained in the first sub region R1 even if the driver vigilance is increased. In the first embodiment according to the present invention, the strength of the action against the driver is selected so that the operating point moves into the target sub region RT. Note that, even if the acting part 10 takes an action against the driver, the autonomous driving output reliance does not change. Therefore, if the action against the driver is taken, the driver vigilance changes while the autonomous driving output reliance is maintained.

On the other hand, if the operating point falls in the second sub region R2 or target sub region RT as shown in FIG. 7 by P2, the strength of the action against the driver is controlled so that the operating point is maintained in the target sub region RT. Specifically, the relatively weak action against the driver is taken and thereby the driver vigilance is increased by a relatively small amount or is maintained. Therefore, the operating point is maintained in the target sub region RT.

If the operating point falls in the third sub region R3 outside of the target sub region RT as shown in FIG. 7 by P3, the strength of the action against the driver is controlled so that the operating point moves into the target sub region RT. Specifically, if the operating point falls in the third sub region R3, the strength of the action against the driver is made zero, that is, the action against the driver is stopped. As explained above, if no action against the driver is taken, the driver vigilance falls along with the elapse of time. Therefore, the operating point then moves to the target sub region RT. In another embodiment according to the present invention (not shown), if the operating point falls in the third sub region R3, the very weak action against the driver is taken so that the operating point moves to the target sub region RT.

In this way, in the first embodiment according to the present invention, if the operating point moves to the first sub region R1 or third sub region R3 outside of the target sub region RT, the operating point is returned to the target sub region RT. Note that the operating point moves from the target sub region RT to the first sub region R1 if the autonomous driving output reliance falls as shown in FIG. 8 by the arrow A1 or if the driver vigilance falls as shown in FIG. 8 by the arrow A2. On the other hand, the operating point moves from the target sub region RT to the third sub region R3 if the autonomous driving output reliance increases as shown in FIG. 8 by the arrow A3 or if the driver vigilance increases as shown in FIG. 8 by the arrow A4. Of course, the autonomous driving output reliance and driver vigilance may change simultaneously.

If the operating point falls in the first sub region R1, it can be understood that the driver is excessively relaxed, while if the operating point falls in the third sub region R3, the driver is excessively tense. As opposed to this, if the operating point falls in the second sub region R2 or the target sub region RT, it can be understood that the driver is suitably relaxed or tense. Therefore, in the first embodiment according to the present invention, the strength of the action against the driver is controlled so that the driver is in a suitable condition.

Further, in the first embodiment according to the present invention, the target sub region RT is defined by the boundary lines B1 and B2 extending so that the driver vigilance becomes higher as the autonomous driving output reliance becomes lower, and thus the target sub region RT extends so that the driver vigilance becomes higher as the autonomous driving output reliance becomes lower. For this reason, if the autonomous driving output reliance is high, maintaining the operating point in the target sub region RT controls the driver vigilance to be lower. This means that the driver is not liable to be excessively tense. On the other hand, if the autonomous driving output reliance is low, the driver vigilance is controlled to be higher. Therefore, the driver is not liable to become excessively relaxed. In this way, both if the autonomous driving output reliance is high and if it is low, the driver vigilance is suitably maintained.

In this way, in the first embodiment according to the present invention, as shown in FIG. 9, the action against the driver is made relatively strong if the operating point falls in the first sub region R1, the action against the driver is made relatively weak if the operating point falls in the target sub region RT, and no action against the driver is made if the operating point falls in the third sub region R3. Accordingly, the action control part 25 is configured to control a strength of the action against the driver so as to differ according to the sub region in which the operating point falls. Note that, the strength of the action against the driver is, for example, stored in advance in the ROM of the storage part 21 in the form of a map shown in FIG. 9.

Figure 10:
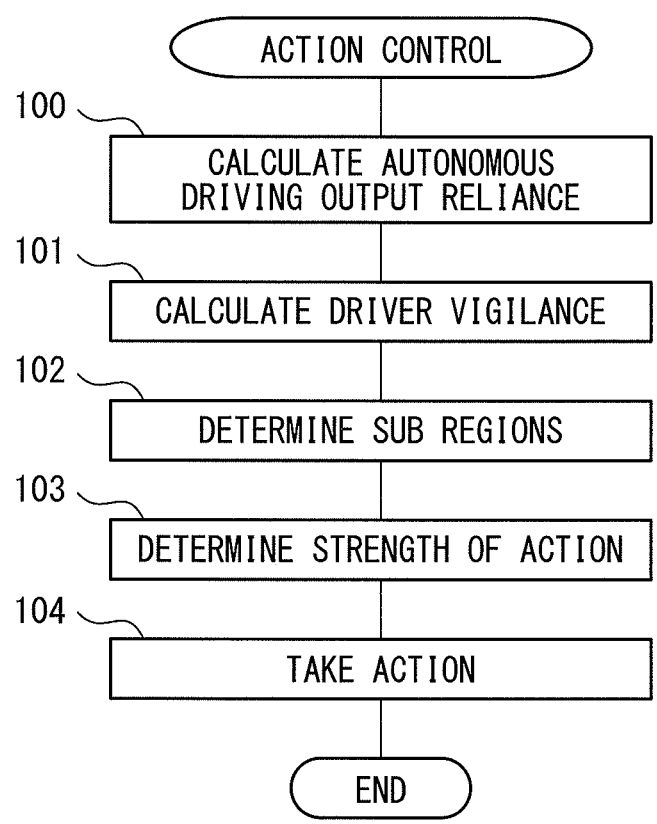
FIG. 10 is a flow chart showing an action control routine of the first embodiment according to the present invention.

FIG. 10 shows a routine showing a processing performed at the action control part 25 of the first embodiment according to the present invention. This routine is repeatedly performed every predetermined set time. Referring to FIG. 10, at step 100, the autonomous driving output reliance is calculated. At the next step 101, the driver vigilance is calculated. At the next step 102, the map of FIG. 6 is used to determine the sub region to which the operating point, determined by the autonomous driving output reliance and driver vigilance, falls. At the next step 103, the map of FIG. 9 is used to determine the strength of the action against the driver. At the next step 104, the action against the driver is taken with the calculated strength.

Figure 11:
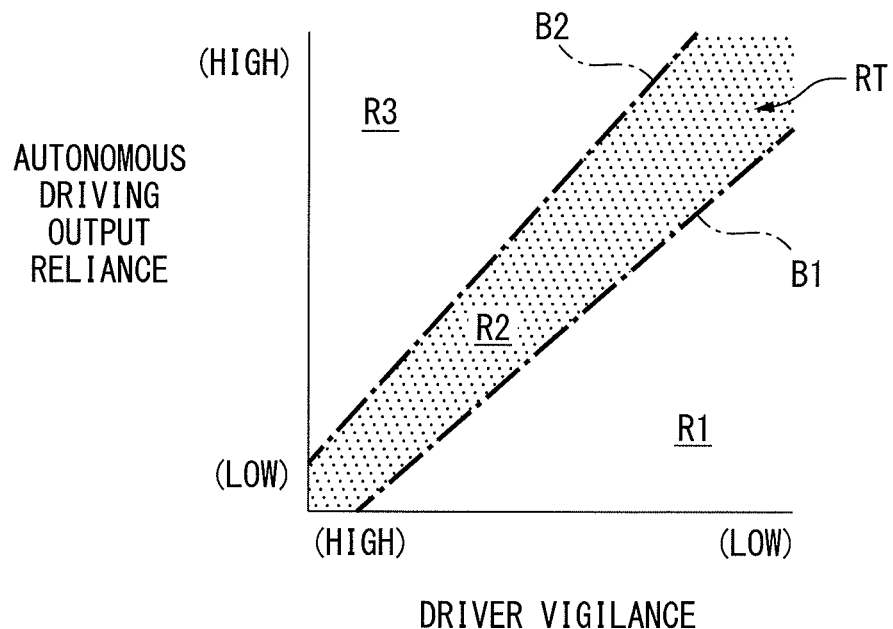
FIG. 11 is a view showing a map of sub regions of another embodiment according to the present invention.
Figure 12:
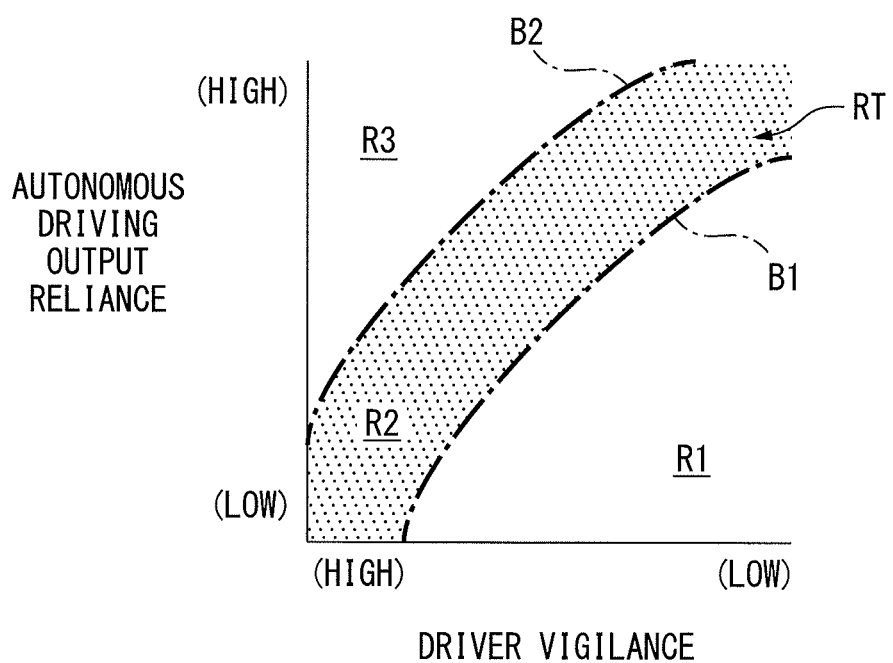
FIG. 12 is a view showing a map of sub regions of another embodiment according to the present invention.

FIG. 11 and FIG. 12 show other examples of the boundary lines. In the example shown in FIG. 6, the two boundary lines B1 and B2 are lines extending in parallel with each other. As opposed to this, in the example shown in FIG. 11, the boundary lines B1 and B2 extend in a non-parallel relationship with each other. Specifically, the boundary lines B1 and B2 extend so as to separate from each other as the autonomous driving output reliance becomes higher and the driver vigilance becomes lower. In another example (not shown), the boundary lines B1 and B2 extend so as to approach each other as the autonomous driving output reliance becomes higher and the driver vigilance becomes lower. On the other hand, in the example shown in FIG. 12, the boundary lines B1 and B2 are curved lines. Specifically, the boundary lines B1 and B2 are upwardly convex curved lines. In another example (not shown), the boundary lines B1 and B2 are downwardly convex curved lines. In a still other example (not shown), one of the boundary lines B1 and B2 is an upwardly convex curved line and the other is a downwardly convex curved line. In still another example (not shown), one of the boundary lines B1 and B2 is a straight line and the other is a curved line.

FIG. 13 to FIG. 16 show other examples of the boundary lines and target sub regions. In the example shown in FIG. 6, in the region in which the operating point can fall, three sub regions are defined by two boundary lines. As opposed to this, in the example shown in FIG. 13, two sub regions R1 and R2 are defined by a single boundary line B in the region in which the operating point can fall. The first sub region R1 is located at the side of the lower autonomous driving output reliance and lower driver vigilance with respect to the boundary line B. The second sub region R2 is located at the side of the higher autonomous driving output reliance and higher driver vigilance with respect to the boundary line B. Further, in the example shown in FIG. 13, the second sub region R2 is set as the target sub region RT.

Figure 14:
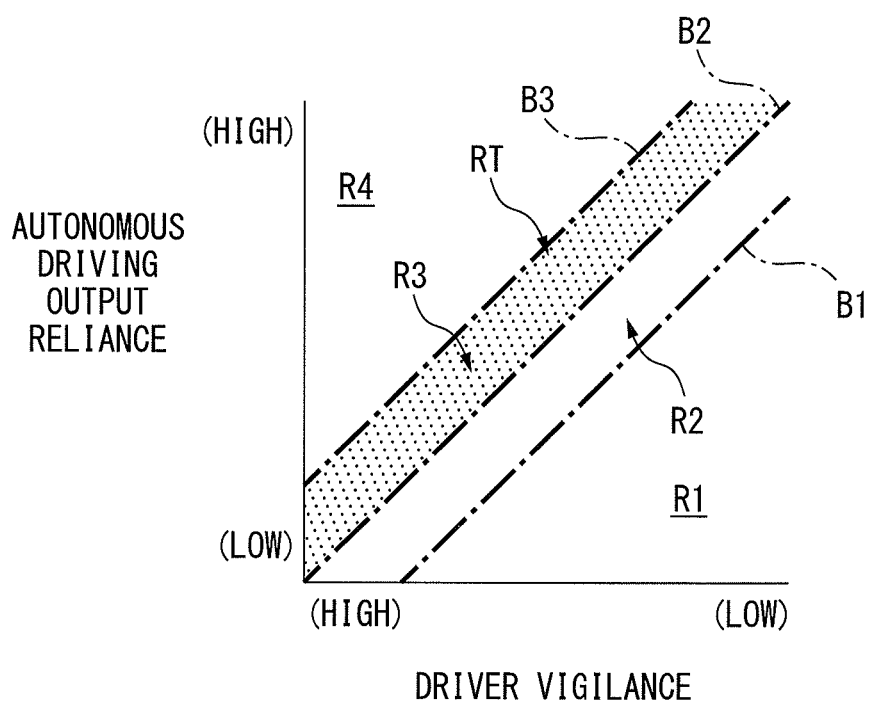
FIG. 14 is a view showing a map of sub regions of another embodiment according to the present invention.
Figure 15:
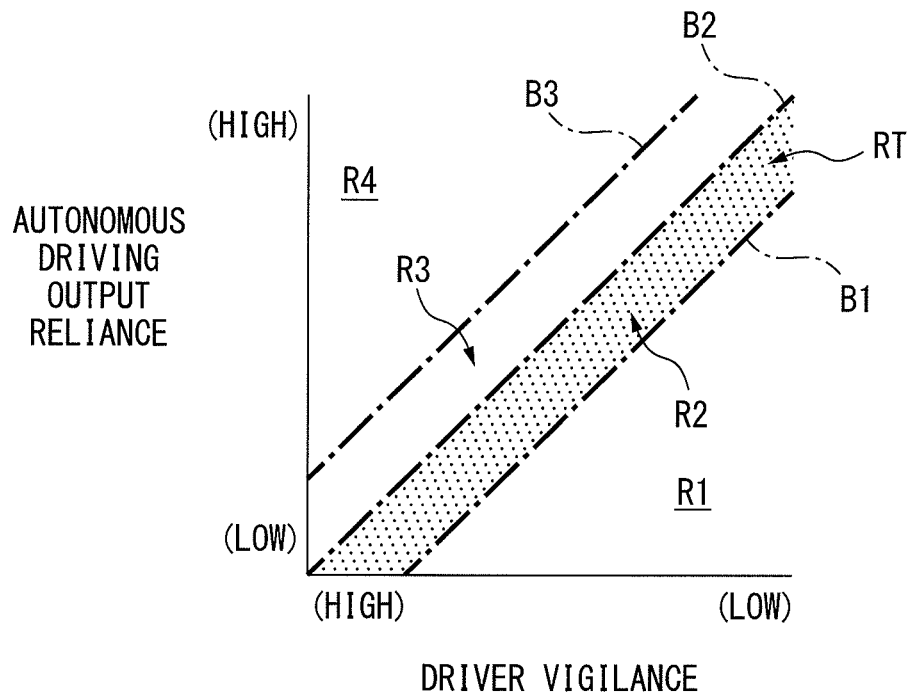
FIG. 15 is a view showing a map of sub regions of another embodiment according to the present invention.
Figure 16:
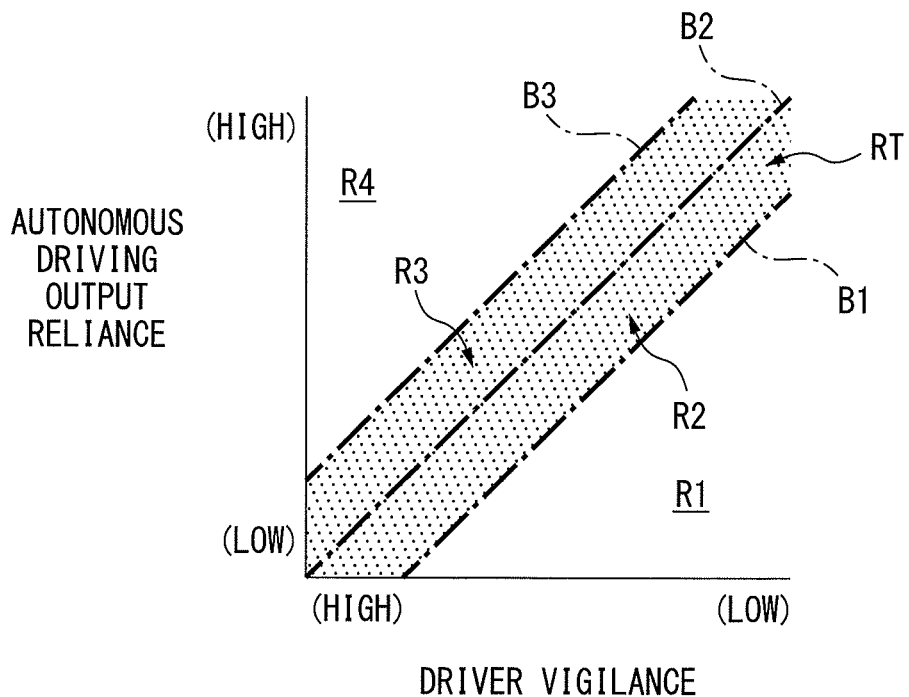
FIG. 16 is a view showing a map of sub regions of another embodiment according to the present invention.

On the other hand, in the examples shown from FIG. 14 to FIG. 16, four sub regions R1, R2, R3, and R4 are defined in the region in which the operating point can fall by three boundary lines B1, B2, and B3. The first sub region R1 is located at the side of the lower autonomous driving output reliance and lower driver vigilance with respect to the first boundary line B1. The second sub region R2 is located between the first boundary line B1 and the second boundary line B2. The third sub region R3 is located between the second boundary line B2 and the third boundary line B3. The fourth sub region R4 is located at the side of the higher autonomous driving output reliance and higher driver vigilance with respect to the third boundary line B3.

In the example shown in FIG. 14, the third sub region R3 is set as the target sub region RT. In the example shown in FIG. 15, the second sub region R2 is set as the target sub region RT. In the example shown in FIG. 16, a plurality of sub regions, that is, the second sub region R2 and the third sub region R3, are set as the target sub region RT. In this regard, it may be understood that the sub regions R2 and R3 between the first boundary line B1 and the third boundary line B2 are set as the target sub region RT.

Therefore, if expressing the examples shown in FIG. 6 and from FIG. 14 to FIG. 16 generically, at least three sub regions are defined in the region in which the operating point can fall, by at least two boundary lines, and at least one sub region between two boundary lines of these boundary lines is set as the target sub region.

Figure 13:
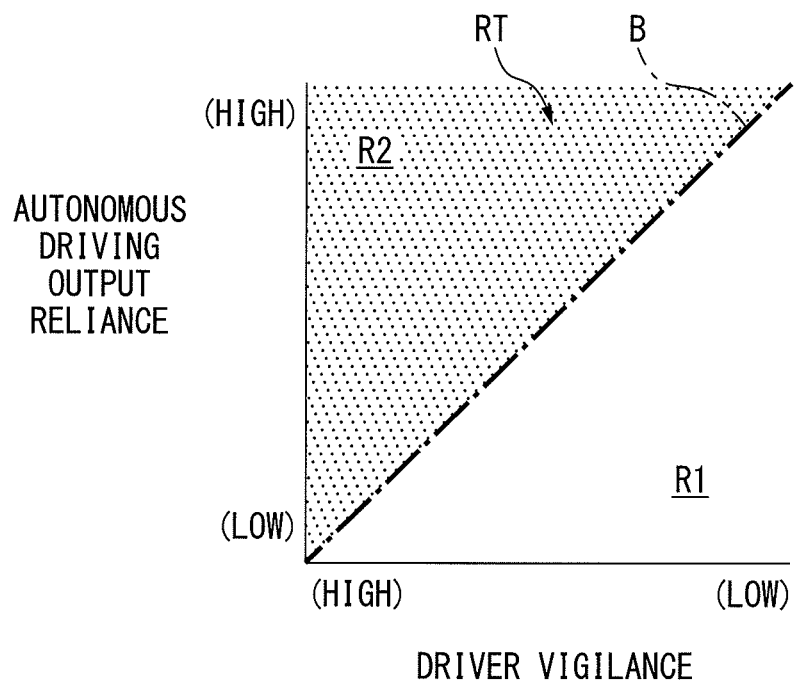
FIG. 13 is a view showing a map of sub regions of another embodiment according to the present invention.

Note that, in the example shown in FIG. 13, for example, the relatively strong action against the driver is taken if the operating point falls in the first sub region R1 and the relatively weak action against the driver is taken if the operating point falls in the second sub region R2, to thereby maintain the operating point in the target sub region RT. On the other hand, in the example shown from FIG. 14 to FIG. 16, for example, the relatively strong action against the driver is taken if the operating point falls in the first sub region R1, the relatively weak action against the driver is taken if the operating point falls in the second sub region R2, the very weak action against the driver is taken if the operating point falls in the third sub region R3, and no action against the driver is taken if the operating point falls in the fourth sub region R4, to thereby maintain the operating point in the target sub region RT.

Furthermore, in the example shown in FIG. 14, if focusing on the first sub region R1 and the second sub region R2 located at the side of the lower autonomous driving output reliance and the lower driver vigilance with respect to the target sub region RT, the first sub region R1 does not adjoin the target sub region RT and is relatively far from the target sub region RT. Further, the second sub region R2 adjoins the target sub region RT and is relatively close to the target sub region RT. On the other hand, as explained above, the relatively strong action against the driver is taken if the operating point falls in the first sub region R1, while the relatively weak action against the driver is taken if the operating point falls in the second sub region R2.

On the other hand, in the example shown in FIG. 15, if focusing on the third sub region R3 and the fourth sub region R4 located at the side of the higher autonomous driving output reliance and the higher driver vigilance with respect to the target sub region RT, the third sub region R3 adjoins the target sub region RT and is relatively close to the target sub region RT. Further, the fourth sub region R4 does not adjoin the target sub region RT and is relatively far from the target sub region RT. On the other hand, as explained above, the relatively strong action against the driver is taken if the operating point falls in the third sub region R3, while no action against the driver is taken if the operating point falls in the fourth sub region R4.

Accordingly, it can be understood that, in the example shown in FIG. 14 and FIG. 15, sub regions R2, R3 close to the target sub region RT and sub regions R1, R4 far from the target sub region are defined outside the target sub region RT by the boundary lines B1, B3, and the action control part 25 is configured to control a strength of the action against the driver to differ between if the operating point falls in the sub regions R2 and R3 close to the target sub region and if the operating point falls in the sub regions R1 and R4 farther from the target sub region, in a case where the operating point is outside the target sub region RT. Furthermore, in the example shown in FIG. 14, the action control part 25 is configured to strengthen the action against the driver if the operating point falls in the sub region R1 farther from the target sub region RT compared with if the operating point falls in the sub region R2 closer to the target sub region RT, in a case where the operating point falls in the sub regions R1 and R2 at the side of the lower autonomous driving output reliance and lower driver vigilance with respect to the target sub region RT. In the example shown in FIG. 15, the action control part 25 is configured to weaken the action against the driver if the operating point falls in the sub region R4 farther from the target sub region RT compared with if the operating point falls in the sub region R3 closer to the target sub region RT, in a case where the operating point falls in the sub regions R3 and R4 at the side of the higher autonomous driving output reliance and higher driver vigilance with respect to the target sub region RT. As a result, in both cases, the operating point outside the target sub region RT is quickly returned to the target sub region RT.

Note that, as explained above, in the first embodiment according to the present invention, if the autonomous driving output reliance is lower than the predetermined lower limit value, the driver is requested manual driving. In other words, if the autonomous driving output reliance is higher than the lower limit value, autonomous driving is continued unless the driver starts manual driving spontaneously. However, the autonomous driving output reliance is liable to suddenly fall. Therefore, the operating point is liable to suddenly move to the first sub region R1 outside of the target sub region RT. In this case, the driver vigilance is liable to be excessively low and the driver is liable to have insufficiently prepared for manual driving. Therefore, in another embodiment according to the present invention (not shown), each time the time during which autonomous driving is continued exceeds a preset time, the action against the driver is temporarily strengthened, to thereby increase the driver vigilance temporarily. As a result, even if the autonomous driving output reliance suddenly falls, the driver can deal with manual driving. The action against the driver in this case is, for example, a request of manual driving to the driver through the HMI 7. Specifically, the driver is requested all or part of the operations for powering, braking, and steering the vehicle. Next, the autonomous driving is resumed after the manual driving is performed for example for a certain time. Alternatively, the autonomous driving is resumed if the driver makes an input operation to start autonomous driving.

In this regard, for example, if the driver is wearing sunglasses or the driver is under a backlight condition, it is difficult for the driver condition sensor 9 to detect the condition of the driver such as the line of vision of the driver. Therefore, it is liable to be impossible to accurately calculate the driver vigilance. If it is impossible to accurately calculate the driver vigilance, it is not possible to accurately determine the operating point and not possible to accurately determine the sub region in which the operating point falls. On the other hand, even under such a situation, autonomous driving is preferably continued. Therefore, in another embodiment according to the present invention (not shown), if it is not possible to accurately calculate the driver vigilance, autonomous driving is continued while taking a strong action against the driver. Therefore, the autonomous driving is continued while the driver vigilance is maintained high. In another embodiment according to the present invention (not shown), if it is not possible to accurately calculate the driver vigilance, manual driving is requested.

Another example of the action against the driver will be explained. If the operating point moves from the target sub region RT to the first sub region R1, the action against the driver is controlled so that the operating point returns to the target sub region RT. In this case, if a drop in the autonomous driving output reliance makes the operating point move to the first sub region R1, a type of action against the driver is controlled to differ depending on reasons for the drop in this autonomous driving output reliance. That is, for example, if a drop in precision of output of the localizing part 22a causes the drop in the autonomous driving output reliance, an orientation of the back part of the driver's seat is changed to be closer to the vertical to thereby increase the driver vigilance so that the driver immediately can start manual driving. If a drop in precision of identification of a moving object causes a drop in precision of output of the integrated recognizing part 22e to thereby cause the drop of the autonomous driving output reliance, or if a drop in precision of output of the tracking part 22d causes the drop in the autonomous driving output reliance, the line of vision of the driver is guided so as to be directed to a moving object(s). That is, for example, if the moving object(s) is located in the right side of the driver, a light etc., positioned at the right side of the driver, included in the acting part 10 is turned on or blinked. If too many moving objects cause a drop in precision of detection of the moving/stationary classifying part 22c to thereby cause the drop in the autonomous driving output reliance, for example, a visual action, or visual action and audio action are taken so that the driver can immediately start manual driving. This is because a mere guiding of the line of vision of the driver is insufficient. If a drop in precision of output of the object detecting part 22b causes the drop in the autonomous driving output reliance, the driver is immediately requested manual driving. The drop in precision of the output of the object detecting part 22*b* is very likely due to a breakdown in the external sensor 1, etc. and continuation of autonomous driving would be difficult.

Next, a second embodiment according to the present invention will be explained. Below, what is different from the first embodiment according to the present invention will be explained.

Figure 17:
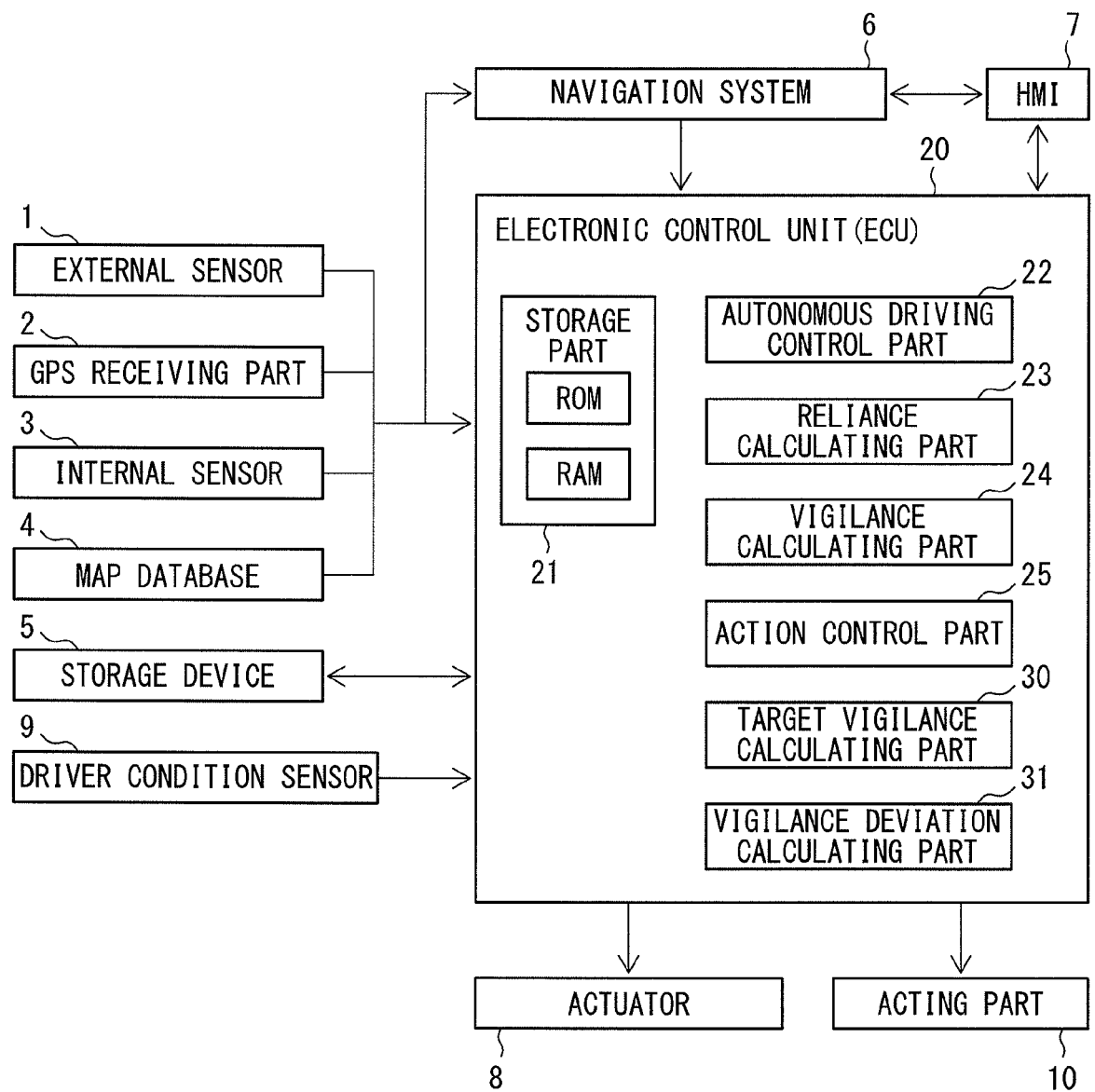
FIG. 17 is a view showing a block diagram of an autonomous driving control system for a vehicle of a second embodiment according to the present invention.

FIG. 17 shows a block diagram of an autonomous driving control system for a vehicle of the second embodiment according to the present invention. Referring to FIG. 17, the electronic control unit 20 is further provided with a target vigilance calculating part 30 and vigilance deviation calculating part 31.

Figure 18:
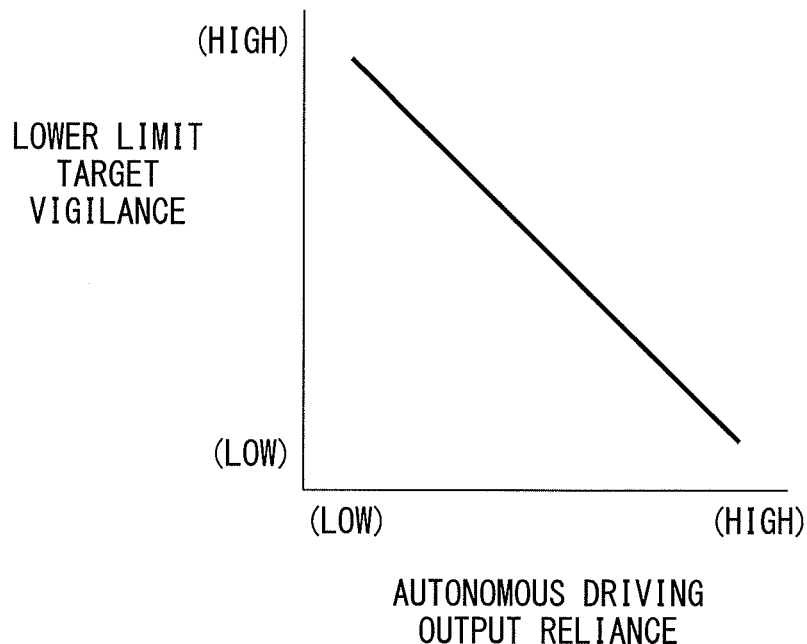
FIG. 18 is a view showing a map of a lower limit target vigilance.

The target vigilance calculating part 30 is configured to calculate a lower limit target vigilance which is a lower limit target value of the driver vigilance, based on the autonomous driving output reliance. This lower limit target vigilance becomes lower as the autonomous driving output reliance becomes higher, as shown in FIG. 18. The lower limit target vigilance is stored in advance in the form of a map shown in FIG. 18 in the ROM of the storage part 21.

Referring again to FIG. 17, the vigilance deviation calculating part 31 is configured to calculate a vigilance deviation which is a deviation of the driver vigilance from the lower limit target vigilance. In the second embodiment according to the present invention, the vigilance deviation is expressed in the form of a difference (driver vigilance-lower limit target vigilance). In another embodiment according to the present invention (not shown), the vigilance difference is expressed in the form of a ratio (vigilance deviation=driver vigilance/lower limit target vigilance).

Based on the above, in the second embodiment according to the present invention, the action control part 25 is configured to control a strength of the action against the driver so that the driver vigilance is maintained equal to or higher than the lower limit target vigilance and the strength differs according to the vigilance deviation. This will be explained with reference to FIG. 19.

Figure 19:
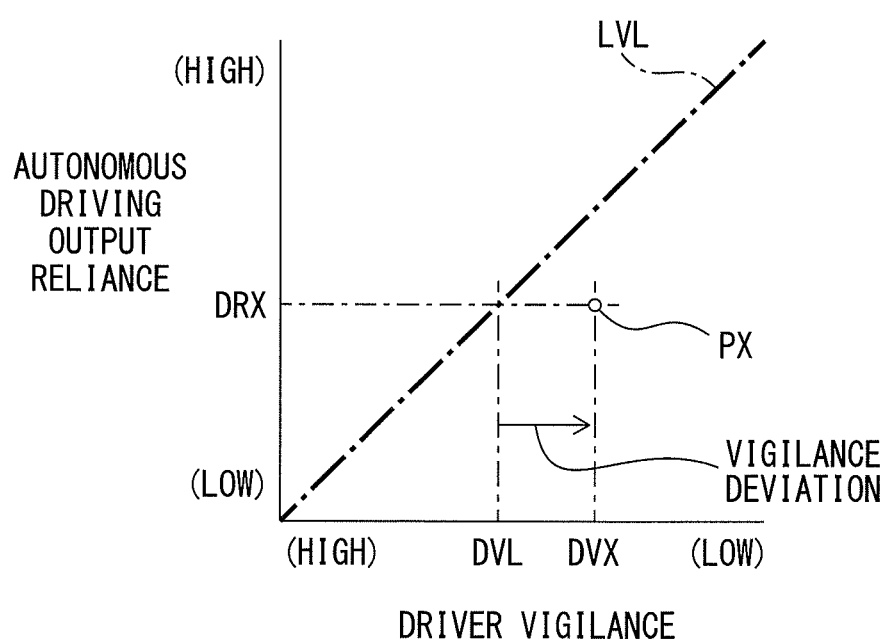
FIG. 19 is a view explaining action control of the second embodiment according to the present invention.

In FIG. 19, PX shows an operating point if the autonomous driving output reliance is DRX and the driver vigilance is DVX. Further, LVL shows a line obtained by connecting the lower limit target vigilances determined in accordance with the autonomous driving output reliance. As shown in FIG. 19, the lower limit target vigilance if the autonomous driving output reliance is DRX is DVL. Therefore, in the second embodiment according to the present invention, the strength of the action against the driver is controlled so that the driver vigilance becomes equal to or higher than DVL.

As a result, the driver vigilance is controlled to be low if the autonomous driving output reliance is high, while the driver vigilance is controlled to be high if the autonomous driving output reliance is low. Therefore, the driver vigilance is maintained suitable both if the autonomous driving output reliance is high and if it is low.

Further, the vigilance deviation at this time is (DVX-DVL). In the second embodiment according to the present invention, the strength of the action against the driver is controlled so as to differ in accordance with this vigilance deviation. Specifically, the action against the driver is controlled to be stronger if the vigilance deviation is small compared to if the vigilance deviation is large.

Figure 20:
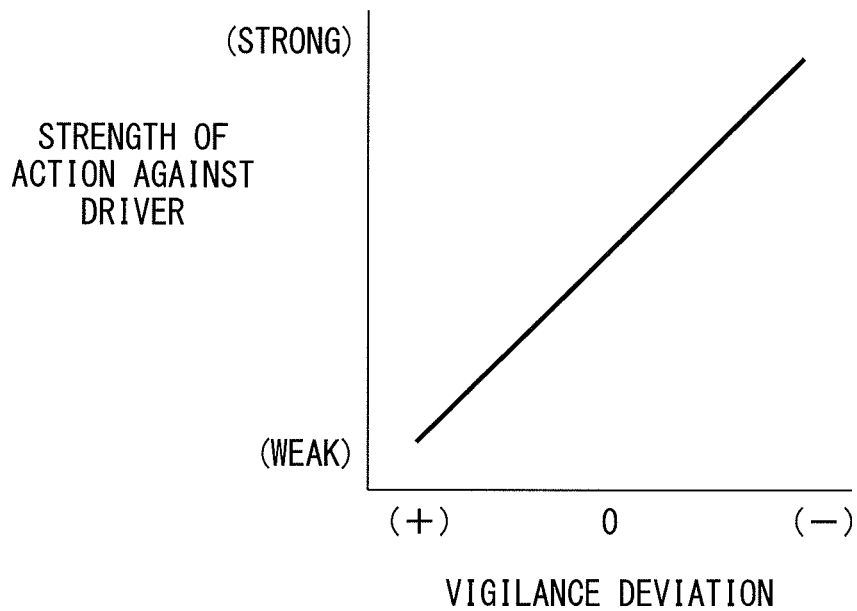
FIG. 20 is a view showing a map of a strength of an action against a driver.
Figure 21:
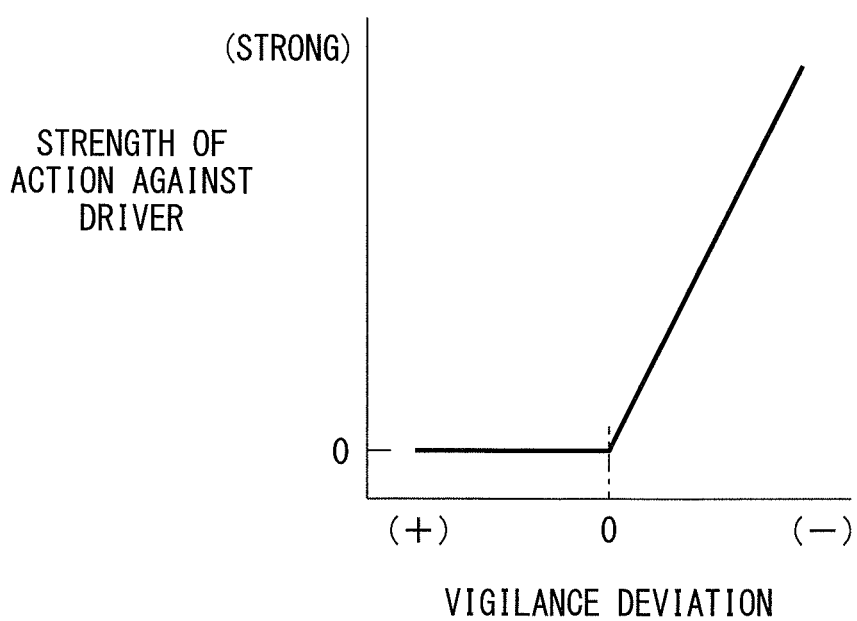
FIG. 21 is a view showing a map of a strength of an action against a driver.

That is, in the second embodiment according to the present invention, as shown in FIG. 20, the action against the driver is controlled to become stronger as the vigilance deviation becomes smaller. The strength of the action against the driver is stored in advance in the form of a map shown in FIG. 20 in the ROM of the storage part 21. As opposed to this, in another embodiment according to the present invention, as shown in FIG. 21, if the vigilance deviation is a positive value or zero, the action against the driver is controlled to zero, that is, the action against the driver is stopped, while if the vigilance deviation is a negative value, the action against the driver is controlled to become stronger as the vigilance deviation becomes smaller. Note that the vigilance deviation is a negative value if the driver vigilance is lower than the lower limit target vigilance, while the vigilance deviation is a positive value if the driver vigilance is higher than the lower limit target vigilance.

As a result, if the driver vigilance is lower than the lower limit target vigilance, the driver vigilance is quickly controlled to be equal to or higher than the lower limit target vigilance, while if the driver vigilance is equal to or higher than the lower limit target vigilance, the driver vigilance is reliably maintained to be equal to or higher than the lower limit target vigilance.

Figure 22:
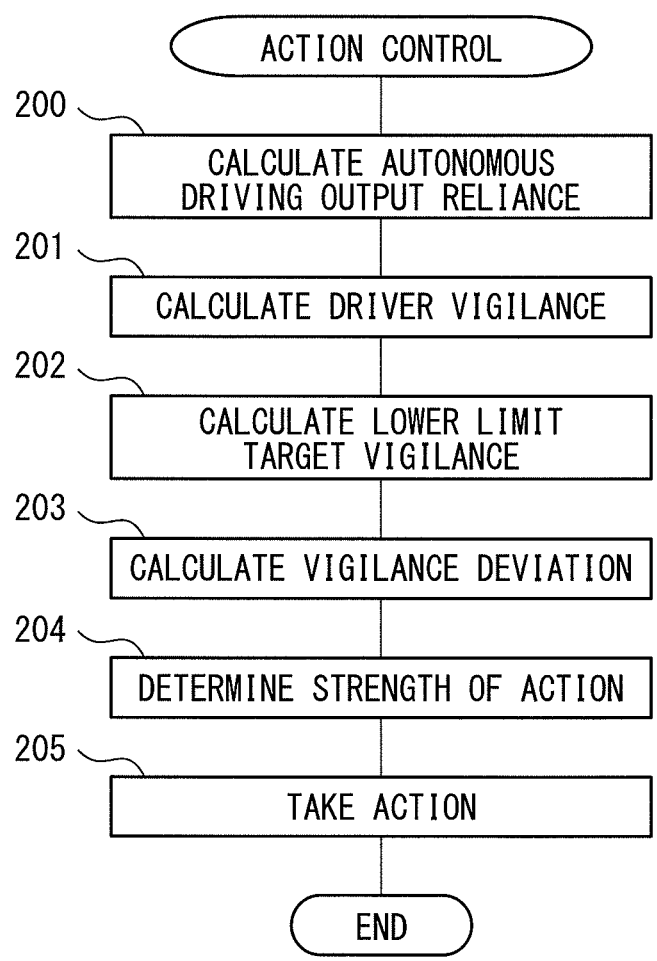
FIG. 22 is a flow chart showing an action control routine of the second embodiment according to the present invention.

FIG. 22 shows a routine showing a processing performed at the action control part 25 of the second embodiment according to the present invention. This routine is repeatedly performed every predetermined set time. Referring to FIG. 22, at step 200, the autonomous driving output reliance is calculated. At the next step 201, the driver vigilance is calculated. At the next step 202, the lower limit target vigilance is calculated using, for example, the map of FIG. 18. At the next step 203, the vigilance deviation is calculated. At the next step 204, the strength of the action against the driver is determined using the map of FIG. 20. At the next step 205, the action against the driver is taken by the calculated strength.

Note that, in the example shown in FIG. 6, it is possible to understand that the strength of the action against the driver is controlled so that the driver vigilance is maintained to be equal to or higher than a driver vigilance expressed by the boundary line B1 and is maintained to be equal to or lower than a driver vigilance expressed by the boundary line B2. Taking the above into account, the boundary line B1 corresponds to a lower limit target of the driver vigilance or a lower limit target vigilance, while the boundary line B2 corresponds to an upper limit target of the driver vigilance or an upper limit target vigilance. Therefore, in another embodiment according to the present invention (not shown), the target vigilance calculating part 30 is configured to calculate the upper limit target of the driver vigilance or the upper limit target vigilance based on the autonomous driving output reliance. The upper limit target vigilance becomes higher as the autonomous driving output reliance becomes lower. The action control part 25 is configured to control the strength of the action against the driver so that the driver vigilance is maintained to be equal to or higher than the lower limit target vigilance and to be equal to or lower than the upper limit target vigilance and that the strength differs according to the vigilance deviation.

In this regard, if referring to a time during which autonomous driving can be continued as a possible autonomous driving duration, the autonomous driving output reliance is higher if the possible autonomous driving duration is long compared to if the possible autonomous driving duration is short. On the other hand, if referring to a time required for the driver to start manual driving as a required driving switching time, the driver vigilance is higher if the required driving switching time is short compared to if the required driving switching time is long. Here, considering smoothly switching from autonomous driving to manual driving, it is preferable that the required driving switching time is equal to or shorter than the possible autonomous driving duration. Therefore, if considering that the required driving switching time corresponds to the lower limit target vigilance, maintaining the driver vigilance to be equal to or higher than the lower limit target vigilance corresponds to maintaining the required driving switching time equal to or shorter than the possible autonomous driving duration. That is, in the second embodiment according to the present invention, the strength of the action against the driver is controlled so that the required driving switching time is maintained to be equal to or shorter than the possible autonomous driving duration.

Next, a third embodiment according to the present invention will be explained. Below, what is different from the second embodiment according to the present invention will be explained.

Figure 23:
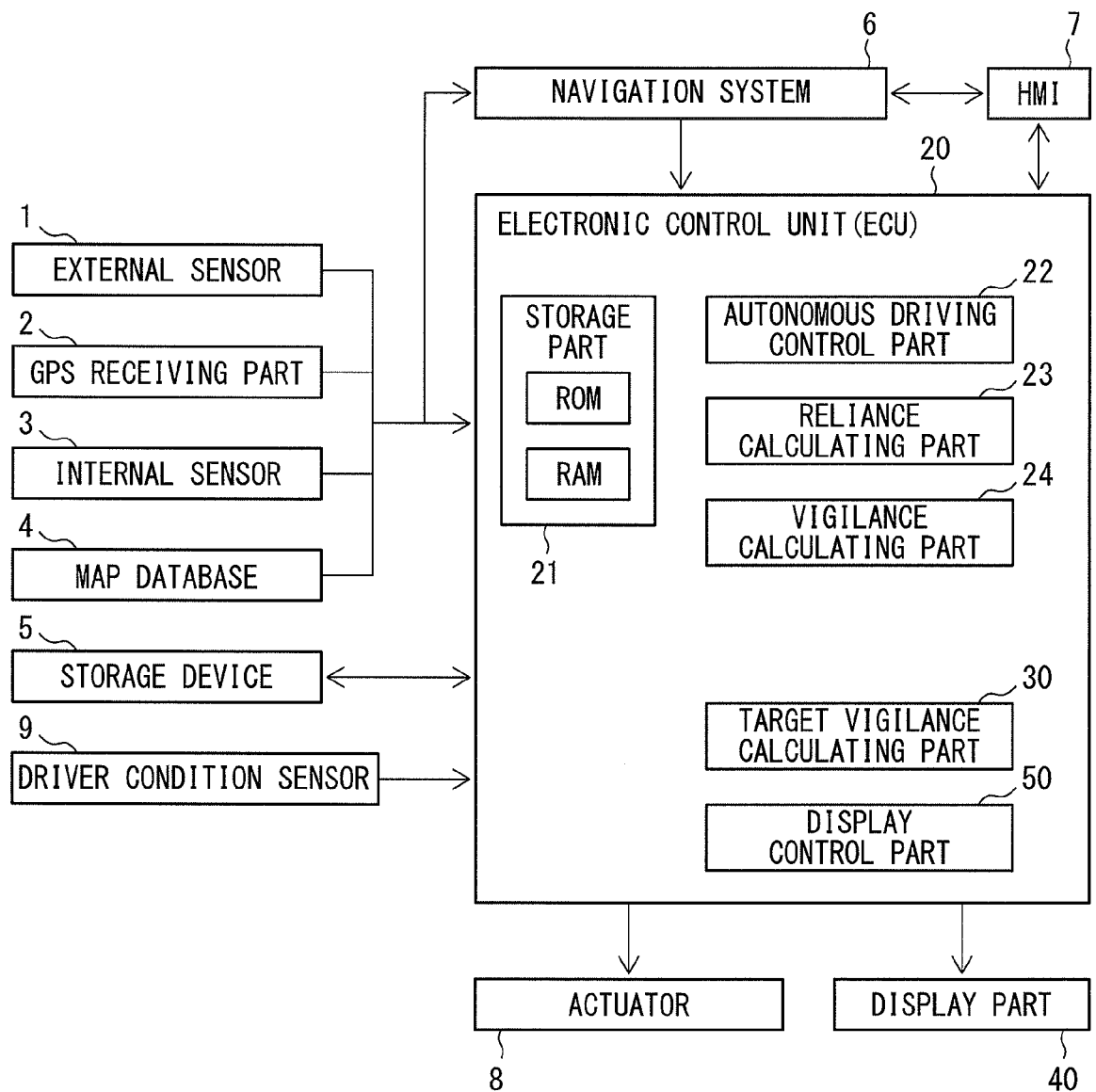
FIG. 23 is a view showing a block diagram of an autonomous driving control system for a vehicle of a third embodiment according to the present invention.

FIG. 23 shows a block diagram of an autonomous driving control system for a vehicle of the third embodiment according to the present invention. Referring to FIG. 23, the autonomous driving control system for a vehicle is further provided with a display part 40 which the driver can view. The display part 40 is provided with a display for displaying, for example, image information. In the third embodiment according to the present invention, the display part 40 and HMI 7 are provided with a common display. In another embodiment according to the present invention (not shown), the display part 40 and HMI 7 are provided with separate displays.

On the other hand, the electronic control unit 20 is further provided with a display control part 50 configured to control the display part 40 to simultaneously display the autonomous driving output reliance and driver vigilance at the display part 40.

Figure 24:
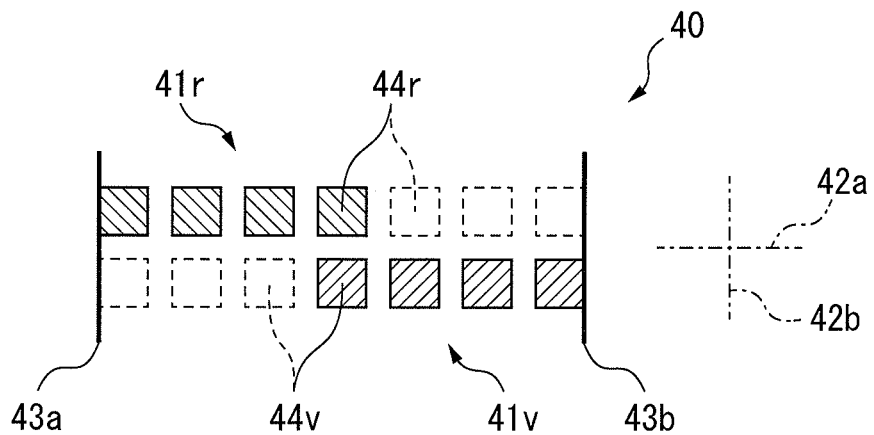
FIG. 24 is a schematic view showing one example of display on a display part of the third embodiment according to the present invention.

FIG. 24 shows one example of the display on the display part 40. As shown in FIG. 24 by 41r, the autonomous driving output reliance is displayed on the display part 40 to direct from a first end portion 43a toward a second end portion 43b along a first axial line 42a as the autonomous driving output reliance becomes higher. Specifically, the autonomous driving output reliance is displayed by a plurality of blocks 44r arranged along the first axial line 42a between the first end portion 43a and the second end portion 43b. These blocks 44r are for example displayed in a lit up state or extinguished state. As the autonomous driving output reliance becomes higher, the number of blocks 44r displayed lit up increases in order from the first end portion 43a side. In the example shown in FIG. 24, the blocks 44r displayed lit up are drawn with hatching, while the blocks 44r displayed extinguished are drawn by broken lines. Therefore, in the example shown in FIG. 24, the display part 40 shows the autonomous driving output reliance is stage 4 in the seven stages.

On the other hand, as shown in FIG. 24 by 41v, the driver vigilance is displayed on the display part 40 to direct from the second end portion 43b toward the first end portion 43a along the first axial line 42a as the driver vigilance becomes higher. Specifically, the driver vigilance is displayed by the plurality of blocks 44v arranged along the first axial line 42a between the first end portion 43a and the second end portion 43b. These blocks 44v are for example displayed in the lit up state or extinguished state. As the driver vigilance becomes higher, the number of blocks 44v displayed lit up is increased in order from the second end portion 43b side. Note that, in the example shown in FIG. 24, the blocks 44v displayed lit up are drawn with hatching, while the blocks 44v displayed extinguished are drawn by broken lines. Therefore, in the example shown in FIG. 24, the display part 40 shows the driver vigilance is stage 4 in the seven stages.

Furthermore, if the driver vigilance is equal to the lower limit target vigilance, the autonomous driving output reliance and driver vigilance are displayed on the display part 40 so that the displayed autonomous driving output reliance 41r and the displayed driver vigilance 41v coincide with each other when viewed in a direction of a second axial line 42b vertical to the first axial line 42a. In the example shown in FIG. 24, the displayed autonomous driving output reliance and the displayed driver vigilance coincide with each other viewed in the second axial line 42b direction. This is for the following reason.

Figure 25:
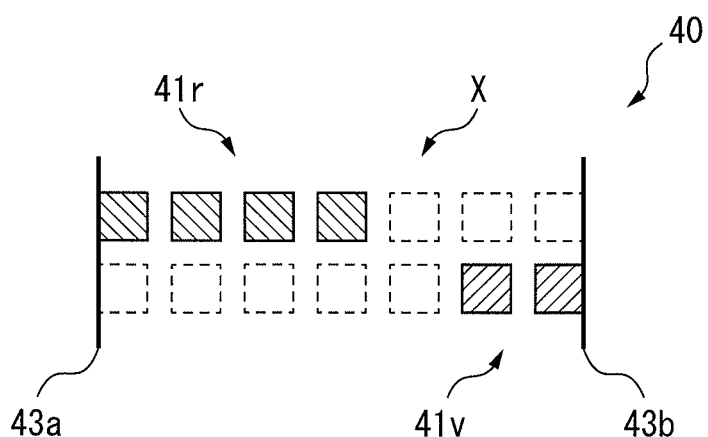
FIG. 25 is a view explaining a display function of the third embodiment according to the present invention.

FIG. 25 shows a case where the driver vigilance is lower than the case shown in FIG. 24. Therefore, FIG. 25 shows the case where the driver vigilance is lower than the lower limit target vigilance. In this case, as shown in FIG. 25 by X, viewed in the second axial line 42b direction, the displayed autonomous driving output reliance 41r and the displayed driver vigilance 41v do not overlap.

Figure 26:
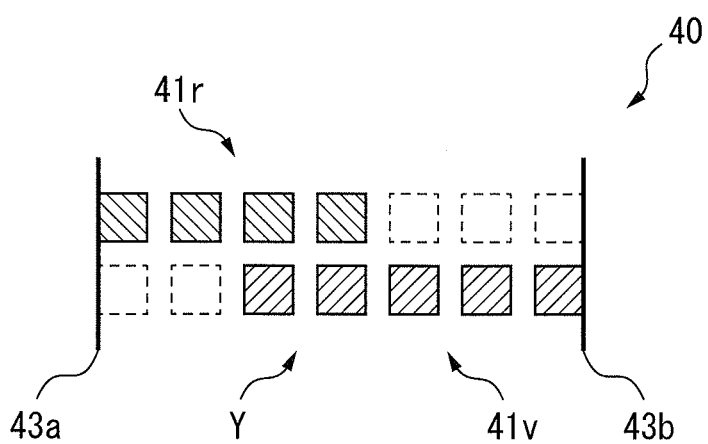
FIG. 26 is a view explaining a display function of the third embodiment according to the present invention.

As opposed to this, FIG. 26 shows a case where the driver vigilance is higher than the case shown in FIG. 24. Therefore, FIG. 26 shows the case where the driver vigilance is higher than the lower limit target vigilance. In this case, as shown in FIG. 26 by Y, viewed in the second axial line 42b direction, the displayed autonomous driving output reliance 41r and the displayed driver vigilance 41v overlap.

That is, the displayed autonomous driving output reliance 41r and the displayed driver vigilance 41v overlap if the driver vigilance is equal to or higher than the lower limit target vigilance, while the displayed autonomous driving output reliance 41r and the displayed driver vigilance 41v do not overlap if the driver vigilance is lower than the lower limit target vigilance. Therefore, if displaying the autonomous driving output reliance and driver vigilance in a side-by-side manner as in the third embodiment according to the present invention, the driver can easily recognize if the driver vigilance is equal to or higher than the lower limit target vigilance. For this reason, if the displayed autonomous driving output reliance 41r and the displayed driver vigilance 41v do not overlap, it is possible for the driver to increase the driver vigilance so that they overlap.

Figure 27:
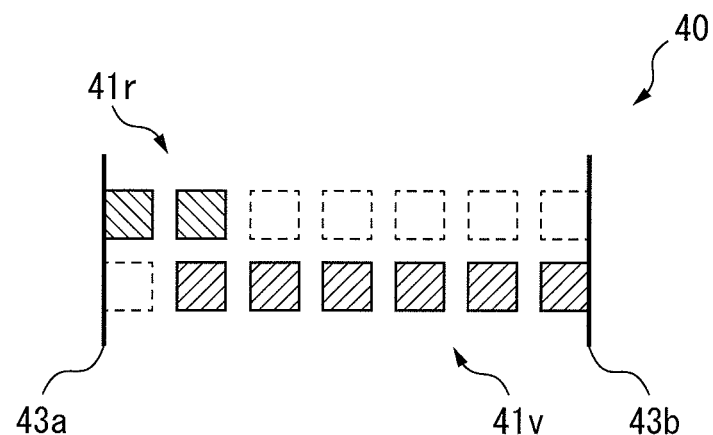
FIG. 27 is a view explaining a display function of the third embodiment according to the present invention.
Figure 28:
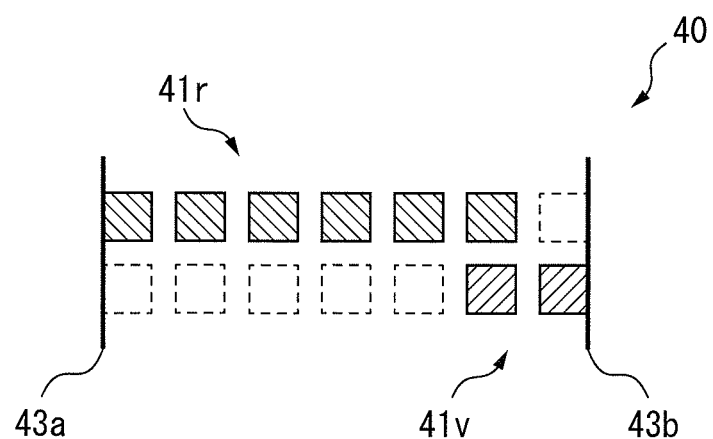
FIG. 28 is a view explaining a display function of the third embodiment according to the present invention.

Note that, FIG. 27 shows a case where the autonomous driving output reliance is lower than the case shown in FIG. 24. In this case, the lower limit target vigilance is high, and thus the driver vigilance has to be high. On the other hand, FIG. 28 shows a case where the autonomous driving output reliance is higher than the case shown in FIG. 24. In this case, the lower limit target vigilance is low, and thus the low driver vigilance is allowable.

Figure 29:
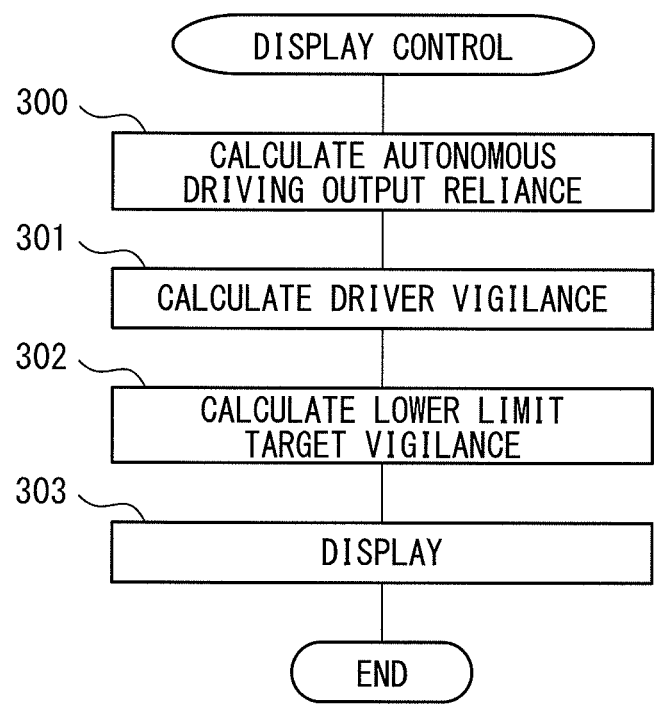
FIG. 29 is a flow chart showing a display control routine of the third embodiment according to the present invention.

FIG. 29 shows a routine showing a processing performed at the display control part 50 of the third embodiment according to the present invention. This routine is repeatedly performed at every predetermined set time. Referring to FIG. 29, at step 300, the autonomous driving output reliance is calculated. At the next step 301, the driver vigilance is calculated. At the next step 302, for example, the map of FIG. 18 is used to calculate the lower limit target vigilance. At the next step 303, the autonomous driving output reliance and driver vigilance are displayed on the display part 40.

Figure 30:
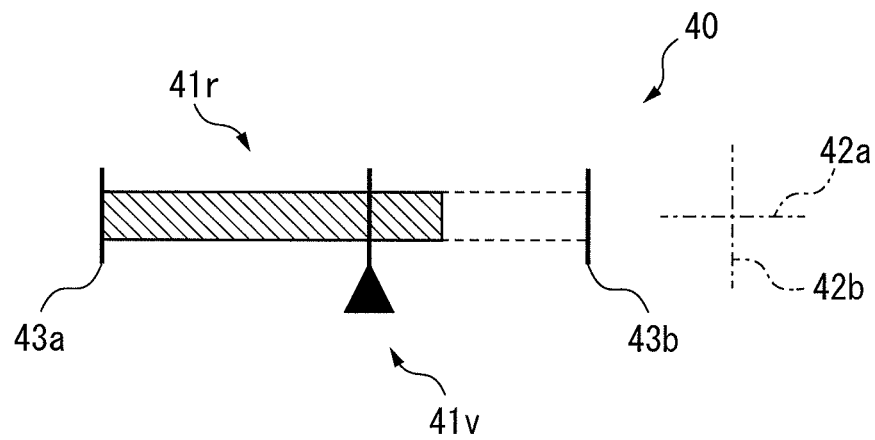
FIG. 30 is a schematic view showing another example of display on a display part.

FIG. 30 shows another example of the display on the display part 40. As shown in FIG. 30 by 41r, the autonomous driving output reliance is expressed by a bar along the first axial line 42a continuously extending from the first end portion 43a toward the second end portion 43b as the autonomous driving output reliance becomes higher. In this case, the bar is displayed so that a length of the bar becomes longer as the autonomous driving output reliance becomes higher.

On the other hand, as shown in FIG. 30 by 41v, the driver vigilance is displayed by a line segment, which moves from the second end portion 43b toward the first end portion 43a along the first axial line 42a as the driver vigilance becomes higher. In this case, the line segment is displayed so as to be separated from the second end portion 43b as the driver vigilance becomes higher.

Furthermore, the autonomous driving output reliance and driver vigilance are displayed on the display part 40 so that the displayed autonomous driving output reliance 41r and the displayed driver vigilance 41v coincide with each other when viewed in the direction of the second axial line 42b vertical to the first axial line 42a if the driver vigilance is equal to the lower limit target vigilance. Therefore, if the driver vigilance is equal to or higher than the lower limit target vigilance, the displayed autonomous driving output reliance 41r and the displayed driver vigilance 41v overlap, while if the driver vigilance is lower than the lower limit target vigilance, the displayed autonomous driving output reliance 41r and the displayed driver vigilance 41v do not overlap. In the example shown in FIG. 30, the displayed autonomous driving output reliance 41r and the displayed driver vigilance 41v overlap. This shows that the driver vigilance is equal to or higher than the lower limit target vigilance.

Figure 31:
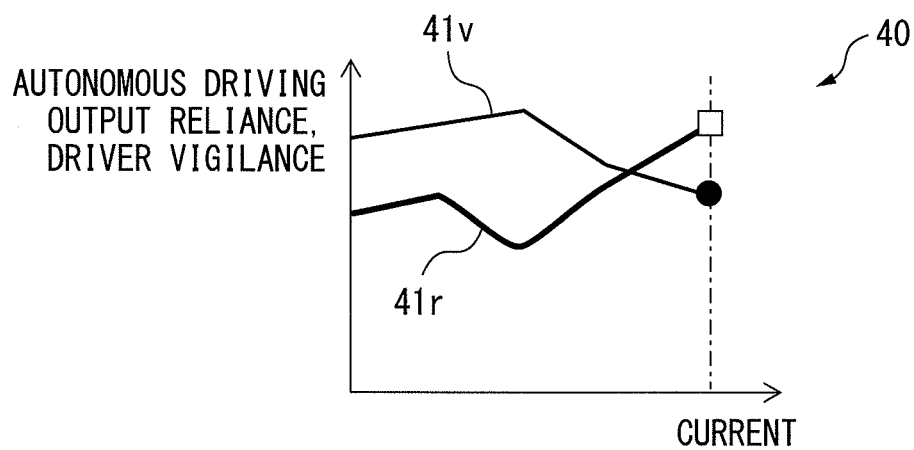
FIG. 31 is a schematic view showing another example of display on a display part.

FIG. 31 shows still another example of display on the display part 40. In the example shown in FIG. 31, a time history of the autonomous driving output reliance is displayed in the form of a line chart as shown by 41r, while a time history of the driver vigilance is displayed in the form of a line chart as shown by 41v.

Figure 32:
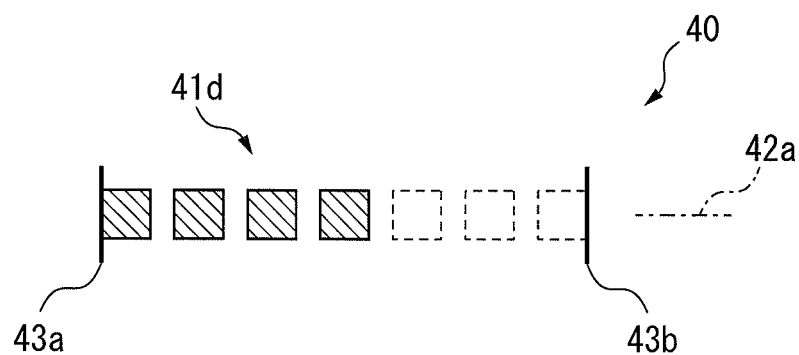
FIG. 32 is a schematic view showing another example of display on a display part.

FIG. 32 shows still another example of display on the display part 40. In the example shown in FIG. 32, the above-mentioned vigilance deviation is displayed as shown by 41d. In this case, the vigilance deviation is displayed on the display part 40 to direct from the first end portion 43a toward the second end portion 43b along the first axial line 42a as the vigilance deviation becomes larger. In the example shown in FIG. 32, if the vigilance deviation is equal to or larger than zero, the number of blocks 44d displayed lit up is increased as the vigilance deviation becomes larger in order from the first end portion 43a side. In other words, if the vigilance deviation is smaller than zero, that is, if the driver vigilance is lower than the lower limit target vigilance, all of the blocks 44d are displayed extinguished. As a result, whether the driver vigilance is equal to or higher than the lower limit target vigilance can be easily recognized by the driver.

It is possible to suitably maintain a driver vigilance regardless of an autonomous driving output reliance.

While the invention has been described by reference to specific embodiments chosen for purposes of illustration, it should be apparent that numerous modifications could be made thereto, by those skilled in the art, without departing from the basic concept and scope of the invention.

This application claims the benefit of JP Application No. 2016-048834, the entire disclosure of which is incorporated by reference herein.

What is claimed is:

1. An autonomous driving control system for a vehicle which is able to switch between manual driving and autonomous driving, the system comprising:
   a driver condition sensor for detecting a condition of a driver;
   an acting part able to take an action against the driver; and
   an electronic control unit comprising:
      an autonomous driving control part configured to control the autonomous driving;
      a reliance calculating part configured to calculate an autonomous driving output reliance expressing a reliance of an output of the autonomous driving control part;
      a vigilance calculating part configured to calculate a driver vigilance expressing a vigilance of the driver for the autonomous driving based on the condition of the driver detected by the driver condition sensor; and
      an action control part configured to control the acting part to control a strength of an action against the driver,
   wherein, in a region in which an operating point determined by the autonomous driving output reliance and the driver vigilance can fall, a plurality of sub regions are defined by at least one boundary line extending so that the driver vigilance becomes higher as the autonomous driving output reliance becomes lower, and
   wherein the action control part is configured to control the strength of the action against the driver to differ in accordance with the sub region in which the operating point falls.

2. The autonomous driving control system for a vehicle according to claim 1,
   wherein a part of the plurality of sub regions is set as a target sub region, and
   wherein the action control part is configured to control the strength of the action against the driver to maintain the operating point within the target sub region.

3. The autonomous driving control system for a vehicle according to claim 2,
   wherein, in the region in which the operating point can fall, at least three sub regions are defined by at least two boundary lines, and
   wherein a sub region between two boundary lines among the boundary lines is set as the target sub region.

4. The autonomous driving control system for a vehicle according to claim 2,
   wherein, in the region outside of the target sub region, the sub region close to the target sub region and the sub region far from the target sub region are defined by the boundary lines, and
   wherein, if the operating point is outside of the target sub region, the action control part is configured to control the strength of the action against the driver to differ between if the operating point falls in the sub region close to the target sub region and if the operating point falls in the sub region far from the target sub region.

5. The autonomous driving control system for a vehicle according to claim 3,
   wherein, in the region outside of the target sub region, the sub region close to the target sub region and the sub region far from the target sub region are defined by the boundary lines, and
   wherein, if the operating point is outside of the target sub region, the action control part is configured to control the strength of the action against the driver to differ between if the operating point falls in the sub region close to the target sub region and if the operating point falls in the sub region far from the target sub region.

6. An autonomous driving control system for a vehicle which is able to switch between manual driving and autonomous driving, the system comprising:

a driver condition sensor for detecting a condition of a driver;

an acting part able to take an action against the driver; and an electronic control unit comprising:
- an autonomous driving control part configured to control the autonomous driving;
- a reliance calculating part configured to calculate an autonomous driving output reliance expressing a reliance of an output of the autonomous driving control part;
- a vigilance calculating part configured to calculate a driver vigilance expressing a vigilance of the driver for the autonomous driving based on the condition of the driver detected by the driver condition sensor;
- a target vigilance calculating part configured to calculate a lower limit target vigilance, which is a lower limit target of the driver vigilance, based on the autonomous driving output reliance, the lower limit target vigilance becoming higher as the autonomous driving output reliance becomes lower;
- a vigilance deviation calculating part configured to calculate a vigilance deviation which is a deviation of the driver vigilance with respect to the lower limit target vigilance; and
- an action control part configured to control the acting part to control a strength of an action against the driver, wherein the action control part is configured to control the strength of the action against the driver so as to:
- maintain the driver vigilance equal to or higher than the lower limit target vigilance; and
- differ in accordance with the vigilance deviation.

7. The autonomous driving control system for a vehicle according to claim 6, wherein the action control part is configured to control the strength of the action against the driver to become stronger if the vigilance deviation is small compared to if the vigilance deviation is large.

8. An autonomous driving control system for a vehicle which is able to switch between manual driving and autonomous driving, the system comprising:
- a driver condition sensor for detecting a condition of a driver;
- a display part which the driver can view; and
- an electronic control unit comprising:
  - an autonomous driving control part configured to control the autonomous driving;
  - a reliance calculating part configured to calculate an autonomous driving output reliance expressing a reliance of an output of the autonomous driving control part;
  - a vigilance calculating part configured to calculate a driver vigilance expressing a vigilance of the driver for the autonomous driving based on the condition of the driver detected by the driver condition sensor; and
  - a display control part configured to control the display part to display the autonomous driving output reliance and the driver vigilance simultaneously on the display part.

9. The autonomous driving control system for a vehicle according to claim 8, wherein the electronic control unit further comprises a target vigilance calculating part configured to calculate a lower limit target vigilance, which is a lower limit target of the driver vigilance, based on the autonomous driving output reliance, the lower limit target vigilance becoming higher as the autonomous driving output reliance becomes lower, and wherein the display control part is configured to:
- display on the display part the autonomous driving output reliance to direct from a first end portion toward a second end portion along a first axial line as the autonomous driving output reliance becomes higher;
- display on the display part the driver vigilance to direct from the second end portion toward the first end portion along the first axial line as the driver vigilance becomes higher; and
- display on the display part the autonomous driving output reliance and the driver vigilance so that the displayed autonomous driving output reliance and the displayed driver vigilance coincide with each other when viewed in a direction of a second axial line vertical to the first axial line if the driver vigilance is equal to the lower limit target vigilance.

\* \* \* \* \*